(12) United States Patent
Hino

(10) Patent No.: US 10,493,833 B2
(45) Date of Patent: Dec. 3, 2019

(54) CURRENT SUPPLY SYSTEM, ELECTRIC POWER SUPPLY SYSTEM, AND CONTROL DEVICE

(71) Applicant: YAMAHA HATSUDOKI KABUSHIKI KAISHA, Iwata-shi, Shizuoka (JP)

(72) Inventor: Haruyoshi Hino, Iwata (JP)

(73) Assignee: YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 92 days.

(21) Appl. No.: 15/587,520

(22) Filed: May 5, 2017

(65) Prior Publication Data
US 2017/0244348 A1    Aug. 24, 2017

Related U.S. Application Data

(63) Continuation-in-part of application No. PCT/JP2015/082928, filed on Nov. 24, 2015.

(30) Foreign Application Priority Data

Nov. 25, 2014  (JP) .................. 2014-237372
Oct. 2, 2015   (JP) .................. 2015-196667
(Continued)

(51) Int. Cl.
*B60L 11/12*    (2006.01)
*B61C 9/38*     (2006.01)
(Continued)

(52) U.S. Cl.
CPC .................. *B60K 1/02* (2013.01); *B60K 1/00* (2013.01); *B60K 6/20* (2013.01); *B60K 6/26* (2013.01);
(Continued)

(58) Field of Classification Search
CPC . B60K 1/02; B60L 50/10; B60L 50/13; B60L 50/14; B60L 50/61; B60W 20/19
See application file for complete search history.

(56) References Cited

U.S. PATENT DOCUMENTS 3,229,138 A   1/1966  Kober
5,763,977 A   6/1998  Shimasaki et al.
(Continued)

FOREIGN PATENT DOCUMENTS

CN   1762086 A   4/2006
CN   1836962 A   9/2006
(Continued)

*Primary Examiner* — Tulsidas C Patel
*Assistant Examiner* — Thomas K Quigley
(74) *Attorney, Agent, or Firm* — Rabin & Berdo, P.C.

(57) ABSTRACT

A current supply system configured to receive a rotational driving force and supply a current for driving an electrical load device in accordance with a current requirement. The current supply system includes a rotor, including a permanent magnet, configured to receive the rotational driving force, and a stator including a stator core with a winding wound thereon, a magnetic circuit for the winding passing through the stator core, the rotational driving force causing the rotor and the stator to generate the current. The current supply system further includes a supply current adjustment device configured to change magnetic resistance of the magnetic circuit for the winding in accordance with the current requirement, to thereby change an inductance of the winding to adjust the generated current.

28 Claims, 7 Drawing Sheets

(30) Foreign Application Priority Data

| | | |
|---|---|---|
| Oct. 2, 2015 | (JP) | 2015-196668 |
| Oct. 2, 2015 | (JP) | 2015-196669 |
| Oct. 2, 2015 | (JP) | 2015-196670 |

(51) Int. Cl.

| | |
|---|---|
| B60K 1/02 | (2006.01) |
| H02K 21/24 | (2006.01) |
| H02P 9/04 | (2006.01) |
| H02K 1/27 | (2006.01) |
| H02K 21/02 | (2006.01) |
| H02P 9/40 | (2006.01) |
| H02M 7/44 | (2006.01) |
| H02P 9/14 | (2006.01) |
| B60K 1/00 | (2006.01) |
| B60K 6/20 | (2007.10) |
| B60K 6/26 | (2007.10) |
| B60W 20/50 | (2016.01) |
| G07C 5/00 | (2006.01) |
| G07C 5/08 | (2006.01) |
| H02K 7/18 | (2006.01) |
| B60W 20/19 | (2016.01) |
| H02K 7/00 | (2006.01) |
| B60L 50/10 | (2019.01) |
| B60L 50/13 | (2019.01) |
| B60L 50/14 | (2019.01) |
| B60L 50/61 | (2019.01) |
| B60W 10/06 | (2006.01) |
| B60W 10/08 | (2006.01) |
| B60W 20/00 | (2016.01) |
| B60K 6/24 | (2007.10) |
| B60K 6/48 | (2007.10) |
| H02P 101/45 | (2016.01) |
| B60K 6/34 | (2007.10) |
| B60K 6/46 | (2007.10) |
| H02P 27/06 | (2006.01) |
| H02P 101/25 | (2016.01) |

(52) U.S. Cl.
CPC ............... *B60L 50/10* (2019.02); *B60L 50/13* (2019.02); *B60L 50/14* (2019.02); *B60L 50/61* (2019.02); *B60W 10/06* (2013.01); *B60W 10/08* (2013.01); *B60W 20/00* (2013.01); *B60W 20/19* (2016.01); *B60W 20/50* (2013.01); *G07C 5/006* (2013.01); *G07C 5/008* (2013.01); *G07C 5/0825* (2013.01); *H02K 1/27* (2013.01); *H02K 7/006* (2013.01); *H02K 7/1815* (2013.01); *H02K 21/021* (2013.01); *H02K 21/026* (2013.01); *H02K 21/028* (2013.01); *H02K 21/029* (2013.01); *H02K 21/24* (2013.01); *H02M 7/44* (2013.01); *H02P 9/04* (2013.01); *H02P 9/14* (2013.01); *H02P 9/40* (2013.01); *B60K 6/24* (2013.01); *B60K 6/34* (2013.01); *B60K 6/46* (2013.01); *B60K 6/48* (2013.01); *B60K 2001/001* (2013.01); *B60L 2220/14* (2013.01); *B60L 2220/50* (2013.01); *B60L 2240/429* (2013.01); *B60W 2300/365* (2013.01); *B60W 2510/083* (2013.01); *B60W 2520/105* (2013.01); *B60W 2710/0644* (2013.01); *B60W 2710/08* (2013.01); *B60W 2710/083* (2013.01); *B60W 2720/106* (2013.01); *B60Y 2200/92* (2013.01); *H02P 27/06* (2013.01); *H02P 2101/25* (2015.01); *H02P 2101/45* (2015.01); *Y02T 10/6217* (2013.01); *Y02T 10/641* (2013.01); *Y02T 10/642* (2013.01); *Y02T 10/7005* (2013.01); *Y02T 10/7077* (2013.01); *Y10S 903/905* (2013.01); *Y10S 903/906* (2013.01); *Y10S 903/93* (2013.01)

(56) References Cited

U.S. PATENT DOCUMENTS

| | | | |
|---|---|---|---|
| 6,057,622 | A | 5/2000 | Hsu |
| 6,072,258 | A | 6/2000 | Lamb |
| 6,943,531 | B2 | 9/2005 | Fukaya |
| 7,064,454 | B2 | 6/2006 | Fukaya et al. |
| 7,204,011 | B2 | 4/2007 | Maslov |
| 7,425,786 | B2 * | 9/2008 | Hino ............... H02K 1/276 310/156.57 |
| 8,288,982 | B2 | 10/2012 | Kauppi |
| 8,761,981 | B2 | 6/2014 | Hussain et al. |
| 2002/0170757 | A1 | 11/2002 | Kitada et al. |
| 2002/0193923 | A1 | 12/2002 | Toyama et al. |
| 2006/0152104 | A1* | 7/2006 | Hino ............... H02K 21/028 310/268 |
| 2007/0029887 | A1 | 2/2007 | Murota et al. |
| 2007/0096581 | A1 | 5/2007 | Zepp et al. |
| 2007/0227792 | A1 | 10/2007 | Yonemori et al. |
| 2009/0072647 | A1* | 3/2009 | Hino ............... B60L 50/16 310/156.15 |
| 2009/0134723 | A1 | 5/2009 | Takeuchi |
| 2009/0206602 | A1 | 8/2009 | Nakamura et al. |
| 2009/0212728 | A1 | 8/2009 | Yagi et al. |
| 2010/0131139 | A1 | 5/2010 | Sakai et al. |
| 2011/0121676 | A1 | 5/2011 | Zhu et al. |
| 2011/0133592 | A1 | 6/2011 | Hino et al. |
| 2011/0202219 | A1 | 8/2011 | Ishibashi |
| 2011/0246010 | A1 | 10/2011 | de la Torre Bueno |
| 2012/0126740 | A1 | 5/2012 | Kauppi |
| 2012/0197472 | A1 | 8/2012 | He et al. |
| 2013/0096745 | A1 | 4/2013 | Hussain et al. |
| 2013/0127244 | A1 | 5/2013 | Handa |

FOREIGN PATENT DOCUMENTS

| | | |
|---|---|---|
| CN | 103503277 A | 1/2014 |
| EP | 1132251 A1 | 9/2001 |
| EP | 1615319 A1 | 1/2006 |
| EP | 1705784 A2 | 9/2006 |
| EP | 1859985 A2 | 11/2007 |
| EP | 1993187 A1 | 11/2008 |
| JP | 2002-345109 A | 11/2002 |
| JP | 2003-306183 A | 10/2003 |
| JP | 2006-271040 A | 10/2006 |
| JP | 2007-195334 A | 8/2007 |
| JP | 2008-048519 A | 2/2008 |
| JP | 2008-285011 A | 11/2008 |
| JP | 2009-195051 A | 8/2009 |
| JP | 2009-225656 A | 10/2009 |
| JP | 2011-092008 A | 5/2011 |
| JP | 2012-044792 A | 3/2012 |
| JP | 2013-180645 A | 9/2013 |
| JP | 2014-084034 A | 5/2014 |
| JP | 2014-108673 A | 6/2014 |
| TW | M358746 U1 | 6/2009 |
| TW | I345539 B | 7/2011 |
| TW | M421259 U1 | 1/2012 |
| TW | M421388 U | 1/2012 |
| TW | 2013-15627 A | 4/2013 |
| TW | I401858 B | 7/2013 |
| WO | WO 2014-054069 A1 | 4/2014 |

\* cited by examiner

CURRENT SUPPLY SYSTEM, ELECTRIC POWER SUPPLY SYSTEM, AND CONTROL DEVICE

CROSS-REFERENCE TO RELATED APPLICATIONS

This is a continuation-in-part application of International Application PCT/JP2015/082928, filed on Nov. 24, 2015, which is based on, and claims priority to, Japanese Patent Application No. 2014-237372, filed on Nov. 25, 2014, and Japanese Patent Application Nos. 2015-196667, 2015-196668, 2015-196669 and 2015-196670, all filed on Oct. 2, 2015, the contents of which are incorporated herein by reference.

TECHNICAL FIELD

The present invention relates to a current supply system, an electric power supply system, and a control device.

BACKGROUND ART

A conventionally known electric power supply system is as follows. The electric power supply system is configured such that mechanical power from a drive source is converted into electric power. The electric power resulting from the conversion is supplied to an apparatus connected to the system. The electric power resulting from the conversion is, for example, converted into heat or re-converted into mechanical power in the apparatus for use therein.

For example, Japanese Patent Application Laid-Open No. 2002-345109 ("JPA'109") shows a vehicle. The vehicle shown in JPA'109 is a hybrid vehicle. This vehicle includes an engine, an accelerator pedal, a first rotary electric machine, a second rotary electric machine, and a drive wheel. The first rotary electric machine is coupled to an output shaft of the engine. The first rotary electric machine functions mainly as a generator. The second rotary electric machine is electrically connected to the first rotary electric machine. The second rotary electric machine functions mainly as a motor. The second rotary electric machine is coupled to the drive wheel of the vehicle.

In the vehicle as shown in JPA'109, a depression of the accelerator pedal by a driver represents a request for acceleration of the vehicle. The vehicle as shown in JPA'109 is, if provided with an electronic-controlled throttle device, able to optionally adjust the amount of air taken in by the engine. The vehicle is, therefore, controlled in the following manner, for example. A target output of the second rotary electric machine (motor) is determined based on the vehicle speed and the amount of depression of the accelerator pedal depressed by the driver. A target electric power to be generated by the first rotary electric machine (generator) is determined in accordance with the target output of the second rotary electric machine. A target output of the engine is determined in accordance with the target electric power to be generated. The amount of air taken in and the amount of fuel injected by the engine are controlled so as to achieve the target output. In this control, the first rotary electric machine is controlled in its generating electric power and the second rotary electric machine is controlled in its output. In a case where the vehicle as shown in JPA'109 is configured with its accelerator pedal mechanically coupled with its engine throttle, the electric power generated by the first rotary electric machine and the output of the second rotary electric machine are controlled in accordance with an actual output of the engine. In JPA'109, as described above, electric power (output) of the rotary electric machine is controlled so as to allow applications to various types of vehicles with different characteristics.

BRIEF SUMMARY OF THE INVENTION

The vehicle as shown in JPA'109, however, involves a problem that it is difficult to obtain an efficient acceleration in a situation where the vehicle traveling at a high speed requires a further acceleration. Examples of the situation where the traveling vehicle requires a further acceleration include a situation where the vehicle starts uphill traveling or a situation where the vehicle overtakes another vehicle during traveling.

To make a further acceleration while traveling at a high speed, the vehicle as shown in JPA'109 further increases the rotation speed of the engine while the motor is rotating at a relatively high rotation speed and the generator is outputting a relatively high voltage. This results in a further increase of the output voltage of the generator. To withstand the further increase of the output voltage, electrical components need to have a high breakdown voltage, which may lead to a decrease in efficiency and a size increase of the system due to an increased breakdown voltage of the electrical components.

For avoiding the increase of the output voltage of the generator, changing output characteristics of the generator by changing the thickness of a winding or the amount of magnets is conceivable. This, however, is accompanied with a problem that increasing the thickness of a winding or the amount of magnets for the purpose of increasing an output current of the generator leads to a size increase of the generator and thus to a size increase of the system.

As described above, the vehicle as shown in JPA'109 has a problem that a size increase of the system is inevitable in obtaining a sufficient acceleration in the situation where the vehicle traveling at a high speed requires a further acceleration. This problem can occur independently of whether the range of the rotation speed of the engine is wide or narrow. In addition, this problem can occur not only in vehicles but also in a current supply system configured to receive a rotational driving force from a drive source and supply a current to an electrical load device that requires a current that can be variable, which will be described later.

The present invention provides a current supply system that is capable of downsizing, compatible with both a drive source with a wide rotation speed range and a drive source with a narrow rotation speed range, and able to supply a current appropriately. The present invention also provides an electric power supply system that is capable of downsizing, compatible with both a drive source with a wide rotation speed range and a drive source with a narrow rotation speed range, and able to supply electric power appropriately.

In various embodiments, the present invention adopts the following configurations.

(1) A current supply system configured to receive a rotational driving force from a drive source and supply a current to an electrical load device that requires a current that can be variable, the current supply system comprising:
 a rotor connected to the drive source, the rotor including a permanent magnet;
 a stator arranged opposed to the rotor, the stator including a winding (or windings) and a stator core with the winding(s) wound thereon; and a supply current adjustment device that adjusts a current to be supplied to the electrical load device, the adjustment implemented by changing an inductance of the winding, the change implemented by changing a magnetic resistance of a magnetic circuit for the winding in accordance with a current requirement of the current supply system, the magnetic circuit passing through the stator core.

The current supply system of (1) is configured such that, when the rotor connected to the drive source is rotated by the rotational driving force, the magnetic flux of the permanent magnet included in the rotor acts on the winding to generate an induced voltage. The induced voltage causes a current to be supplied to the electrical load device. In the current supply system of (1), the supply current adjustment device adjusts the current to be supplied to the electrical load device, the adjustment implemented by changing the inductance of the winding, the change implemented by changing the magnetic resistance of the magnetic circuit for the winding, which passes through the stator core, in accordance with a current requirement of the current supply system. The ratio of a current change to a voltage change obtained when changing the magnetic resistance of the magnetic circuit for the winding, which passes through the stator core, is different from that obtained when, for example, changing the rotation speed of the drive source. The current supply system of (1) is, therefore, able to adjust the current to be supplied to the electrical load device with less interaction between the voltage change and the current change as compared with when, for example, only the rotation speed of the drive source is changed.

In addition, the current supply system of (1) adjusts the current to be supplied to the electrical load device, the adjustment implemented by changing the inductance of the winding, the change implemented by changing the magnetic resistance of the magnetic circuit for the winding, which passes through the stator core. That is, the current supply system of (1) is able to adjust the current to be supplied to the electrical load device with suppression of increase in the thickness of the winding and the amount of the magnet. This allows downsizing of the current supply system itself.

Accordingly, the current supply system of (1) is capable of downsizing, compatible with both a drive source with a wide rotation speed range and a drive source with a narrow rotation speed range, and able to supply a current appropriately.

(2) The current supply system of (1), wherein
the magnetic circuit for the winding, which passes through the stator core, includes at least one non-magnetic gap, and
the supply current adjustment device adjusts the current to be supplied to the electrical load device, the adjustment implemented by changing the inductance of the winding, the change implemented by changing a magnetic resistance of, among the at least one non-magnetic gap, a non-magnetic gap existing between the winding and the rotor.

In the configuration of (2), the supply current adjustment device changes the inductance of the winding by changing the magnetic resistance of the non-magnetic gap existing between the winding and the rotor. The permanent magnet moving along with rotation of the rotor causes an alternating magnetic field to occur between the winding and the rotor. For example, reducing the magnetic resistance of the non-magnetic gap existing between the winding and the rotor leads to a reduction of an alternating magnetic field loss. This can increase the current relative to the rotational power supplied to the rotor. Accordingly, the current to be supplied to the electrical load device can be adjusted to an increased degree.

(3) The current supply system of (1) or (2), wherein
the magnetic circuit for the winding, which passes through the stator core, includes at least one non-magnetic gap, and
the supply current adjustment device adjusts the current to be supplied to the electrical load device, the adjustment implemented by changing the inductance of the winding, the change implemented by changing a magnetic resistance of, among the at least one non-magnetic gap, a non-magnetic gap whose magnetic resistance is highest when the inductance of the winding is set to the highest settable value.

The configuration of (3) changes the magnetic resistance of the non-magnetic gap whose magnetic resistance is highest when the inductance of the winding is set to the highest settable value. This makes it easy to increase the amount of change of the inductance of the winding. Accordingly, the current can be adjusted to an increased degree.

(4) The current supply system of any one of (1) to (3), wherein
the supply current adjustment device adjusts the supply current by changing the inductance of the winding such that the change rate of a magnetic flux linked with the winding is lower than the change rate of the inductance of the winding, the change implemented by changing the magnetic resistance of the magnetic circuit for the winding, which passes through the stator core, in accordance with a current requirement of the current supply system.

In the configuration of (4), the supply current adjustment device changes the inductance of the winding such that the change rate of the magnetic flux linked with the winding is lower than the change rate of the inductance of the winding. The magnetic flux linked with the winding is influential to the voltage and current, while the inductance of the winding is influential mainly to the current. The supply current adjustment device is, therefore, able to adjust the supply current in accordance with a current requirement of the current supply system, with the change rate of the voltage being lower than the change rate of the current. That is, the supply current adjustment device is able to adjust the current while less influenced by voltage constraints. Accordingly, the configuration of (4) is capable of downsizing, compatible with both a drive source with a wide rotation speed range and a drive source with a narrow rotation speed range, and able to supply a current more appropriately.

(5) The current supply system according to any one of (1) to (4), wherein
the supply current adjustment device adjusts the current to be supplied to the electrical load device, the adjustment implemented by changing the inductance of the winding, the change implemented by changing the magnetic resistance of the magnetic circuit for the winding, which passes through the stator core, the change of the magnetic resistance implemented by moving the position of at least a portion of the stator core relative to the winding in accordance with a current requirement of the current supply system.

The configuration of (5), in which the supply current adjustment device moves the position of at least a portion of the stator core relative to the winding so that the magnetic resistance of the magnetic circuit for the winding which passes through the stator core is changed, is able to further ensure the change of the inductance of the winding. This can further ensure that the current to be supplied to the electrical load device be adjusted in accordance with a current requirement of the current supply system. The configuration of (5) is reliably compatible with both a drive source with a wide rotation speed range and a drive source with a narrow rotation speed range.

(6) The current supply system of (5), wherein the supply current adjustment device adjusts the current to be supplied to the electrical load device, the adjustment implemented by changing the inductance of the winding, the change implemented by changing the magnetic resistance of the magnetic circuit for the winding, which passes through the stator core, the change of the magnetic resistance implemented by moving the position of the stator core relative to the winding while maintaining the position of the stator core relative to the rotor in accordance with a current request issued to the current supply system.

The configuration of (6), which moves the position of the stator core relative to the winding while maintaining the position of the stator core relative to the rotor, is able to suppress a change of the magnetic flux that flows from the permanent magnet of the rotor to the stator core. That is, a change of the magnetic flux generated by the permanent magnet and linked with the winding is suppressed. As a result, a change of the voltage is suppressed which otherwise might be caused when the position of the stator core relative to the winding is moved. Accordingly, the configuration of (6) is compatible with both a drive source with a wide rotation speed range and a drive source with a narrow rotation speed range, and able to supply a current more appropriately.

(7) The current supply system according to any one of (1) to (5), wherein the supply current adjustment device adjusts the current to be supplied to the electrical load device, the adjustment implemented by changing the inductance of the winding, the change implemented by changing the magnetic resistance of the magnetic circuit for the winding, which passes through the stator core, the change of the magnetic resistance implemented by moving the winding in accordance with a current requirement of the current supply system.

The configuration of (7), which moves the position of the winding relative to the stator core while maintaining the position of the stator core relative to the rotor, is able to suppress a change of the magnetic flux that flows from the permanent magnet of the rotor to the stator core. That is, a change of the magnetic flux generated by the permanent magnet and linked with the winding is suppressed. As a result, a change of the voltage is suppressed which otherwise might be caused when the position of the stator core relative to the winding is moved. Accordingly, the configuration of (7) is compatible with both a drive source with a wide rotation speed range and a drive source with a narrow rotation speed range, and able to supply a current more appropriately.

(8) The current supply system according to any one of (1) to (3), comprising:

a supply voltage adjustment device that adjusts a voltage to be supplied to the electrical load device, the adjustment implemented by changing an induced voltage of the winding, the change implemented by changing a linkage flux flowing from the permanent magnet of the rotor and linked with the winding.

The configuration of (8), which can enhance separation between the adjustment of the current to be supplied to the electrical load device and the adjustment of the voltage to be supplied to the electrical load device, is able to make an adjustment that is more responsive to each of a current requirement and a voltage requirement. Accordingly, the configuration of (8) is highly compatible with both a drive source with a wide rotation speed range and a drive source with a narrow rotation speed range.

(9) The current supply system of (8), wherein the supply voltage adjustment device adjusts the voltage to be supplied to the electrical load device, the adjustment implemented by changing the induced voltage of the winding, the change implemented by changing the linkage flux flowing from the permanent magnet of the rotor and linked with the winding, the change of the linkage flux implemented by moving the position of the permanent magnet relative to the winding.

The configuration of (9) is able to ensure the adjustment of the voltage to be supplied to the electrical load device. The configuration of (9) is reliably compatible with both a drive source with a wide rotation speed range and a drive source with a narrow rotation speed range.

(10) The current supply system according to any one of (1) to (5), wherein the stator core includes a plurality of first stator core parts and a second stator core part, each of the plurality of first stator core parts having a facing portion that opposes the rotor with a non-magnetic gap therebetween, the second stator core part not having the facing portion, and the supply current adjustment device changes the magnetic resistance of the magnetic circuit for the winding, which passes through the stator core, the change implemented by moving one of the plurality of first stator core parts and the second stator core part relative to the other in accordance with a current requirement of the current supply system.

In the configuration of (10), the supply current adjustment device moves one of the plurality of first stator core parts and the second stator core part included in the stator core relative to the other. Such a configuration provides a larger change of the magnetic resistance of the magnetic circuit for the winding, which passes through the stator core, as compared with a configuration in which, for example, one of the stator core and a member different from the stator core is moved relative to the other. Thus, the current to be supplied to the electrical load device can be adjusted over a wider range in accordance with a current requirement of the current supply system. Accordingly, the configuration of (10) is highly compatible with both a drive source with a wide rotation speed range and a drive source with a narrow rotation speed range.

(11) The current supply system of (10), wherein the supply current adjustment device changes the magnetic resistance of the magnetic circuit for the winding, which passes through the stator core, the change implemented by moving one of the plurality of first stator core parts and the second stator core part relative to the other so as to shift from a first state to a second state, the first state being a state in which the length of a non-magnetic gap between each of the plurality of first stator core parts and the second stator core part is shorter than the length of a non-magnetic gap between adjacent ones of the plurality of first stator core parts, the second state being a state in which the length of the non-magnetic gap between each of the plurality of first stator core parts and the second stator core part is longer than the length of the non-magnetic gap between adjacent ones of the plurality of first stator core parts.

In the configuration of (11), in the first state, the length of the non-magnetic gap between each of the plurality of first stator core parts and the second stator core part is shorter than the length of a non-magnetic gap between adjacent ones of the plurality of first stator core parts. In the second state, the length of the non-magnetic gap between each of the plurality of first stator core parts and the second stator core part is longer than the length of a non-magnetic gap between adjacent ones of the plurality of first stator core parts.

In the first state, therefore, a portion of the magnetic flux generated by the current in the winding, which portion flows through the non-magnetic gap between the adjacent first stator core parts, flows mainly through the non-magnetic gap between the first stator core part and the second stator core part. That is, the magnetic flux generated by the current in the winding flows mainly through both the first stator core part and the second stator core part. In the second state, the magnetic resistance of the magnetic circuit passing through the first stator core part is higher. The magnetic resistance of the magnetic circuit for the winding, which passes through the stator core, is changed more largely. Accordingly, the configuration of (11) is highly compatible with both a drive source with a wide rotation speed range and a drive source with a narrow rotation speed range.

(12) An electric power supply system comprising:
the current supply system according to any one of (1) to (10);
the drive source; and
a drive source rotation speed adjustment device that changes the rotation speed of the drive source to change the rotation speed of the rotor so that the voltage to be supplied to the electrical load device is adjusted.

In the electric power supply system of (12), the drive source rotation speed adjustment device changes the rotation speed of the drive source to change the rotation speed of the rotor so that the voltage to be supplied to the electrical load device is adjusted. The supply current adjustment device included in the current supply system adjusts the current to be supplied to the electrical load device, the adjustment implemented by changing the inductance of the winding, the change implemented by changing the magnetic resistance of the magnetic circuit for the winding, which passes through the stator core. Electric power is controlled by both the drive source rotation speed adjustment device and the supply current adjustment device. The electric power supply system of (12), which can enhance separation between the adjustment of the current to be supplied to the electrical load device and the adjustment of the voltage to be supplied to the electrical load device, is able to make an adjustment that is more responsive to each of a current requirement and a voltage requirement. Accordingly, the electric power supply system of (12) is capable of downsizing, and highly compatible with both a drive source with a wide rotation speed range and a drive source with a narrow rotation speed range.

(13) A control device for use in a current supply system configured to receive a rotational driving force from a drive source and supply a current to an electrical load device that requires a current that can be variable,
the current supply system comprising:
a rotor connected to the drive source, the rotor including a permanent magnet;
a stator arranged opposed to the rotor, the stator including a winding and a stator core with the winding wound thereon; and
a current adjustment mechanism that adjusts a current to be supplied to the electrical load device, the adjustment implemented by changing an inductance of the winding, the change implemented by changing a magnetic resistance of a magnetic circuit for the winding, the magnetic circuit passing through the stator core,
the control device directing the current adjustment mechanism to change the magnetic resistance of the magnetic circuit passing through the stator core, to change the inductance of the winding, in accordance with a current requirement of the current supply system.

The control device of (13) is able to adjust the current to be supplied to the electrical load device with less interaction between the voltage change and the current change as compared with when, for example, only the rotation speed of the drive source is changed. Accordingly, the control device of (13) allows the current supply system to be downsized, and also allows the current supply system to be compatible with both a drive source with a wide rotation speed range and a drive source with a narrow rotation speed range. Moreover, the control device of (13) enables the current supply system to supply a current appropriately.

Advantageous Effects of Invention

The present invention provides: a current supply system that is capable of downsizing, compatible with both a drive source with a wide rotation speed range and a drive source with a narrow rotation speed range, and able to supply a current appropriately; and a control device for the current supply system. The present invention also provides an electric power supply system that is capable of downsizing, compatible with both a drive source with a wide rotation speed range and a drive source with a narrow rotation speed range, and able to supply electric power appropriately.

DETAILED DESCRIPTION OF THE INVENTION

Figure 1:
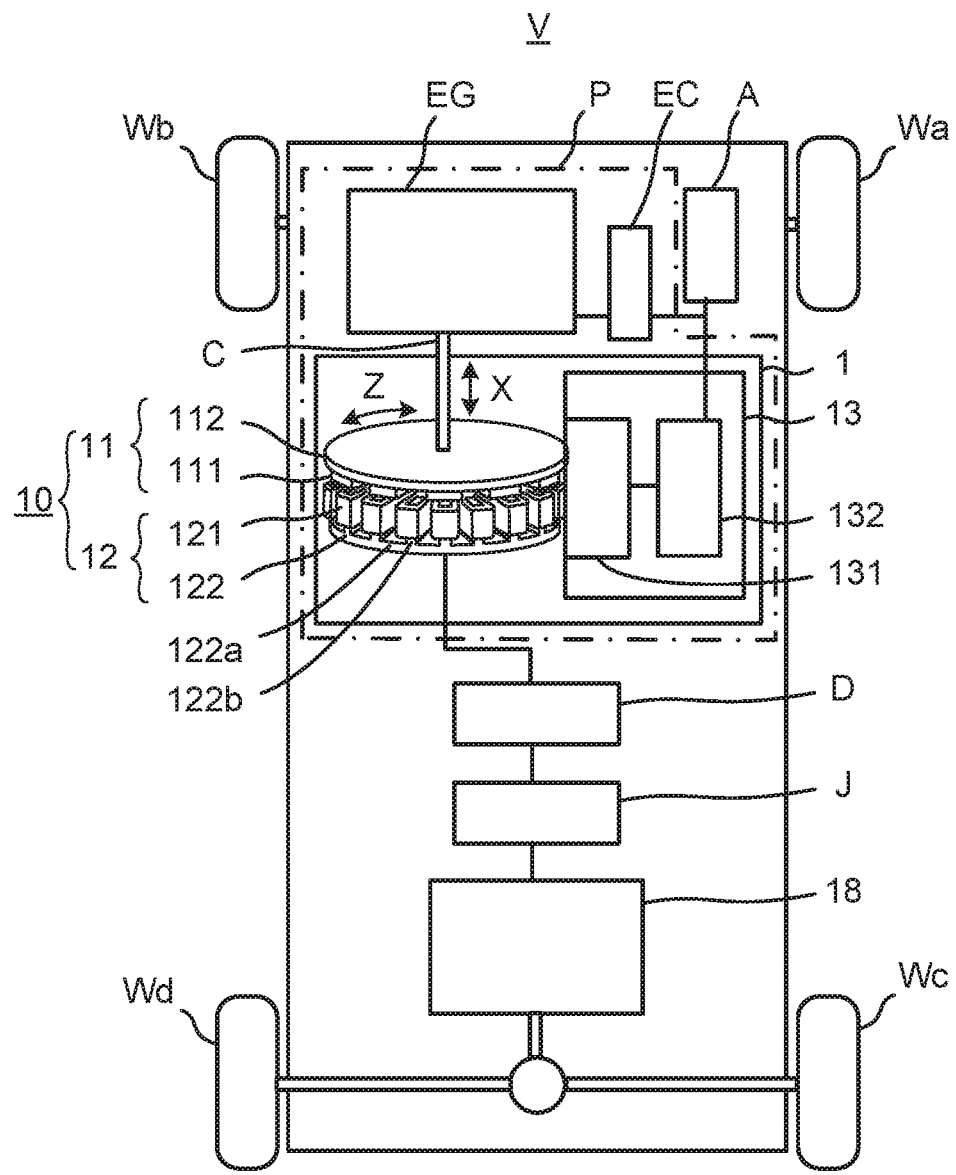
FIG. 1 is a block diagram showing an outline configuration of an apparatus having mounted thereon a current supply system according to a first embodiment of the present invention.

A description will be given of studies conducted by the present inventor about a current supply system configured to receive a rotational driving force from a drive source and supply a current to an electrical load device that requires a current that can be variable.

For example, in a case of the vehicle as shown in JPA' 109 configured such that the engine output is controlled based on the amount of depression of the accelerator pedal depressed by a driver; both the output torque and the rotation speed of the engine are changed. The change rate of the rotation speed of the engine is higher than the change rate of the output torque of the engine. The change of the rotation speed of the engine has a direct influence on a change of a power generation voltage of the generator (first rotary electric machine). The change of the power generation voltage causes a change of a power generation current of the generator. An increase of power generated by the generator, which is in accordance with an increase of the engine output, is caused mainly by an increase of the power generation voltage. In the vehicle as shown in JPA' 109, therefore, an attempt to increase power generated by the generator involves a large increase of the power generation voltage.

For example, to make a further acceleration while traveling at a high speed, it is necessary to further increase the engine output while the motor (second rotary electric machine) is rotating at a relatively high rotation speed and the generator is outputting a relatively high voltage. This results in a further increase of the output voltage of the generator. This is why electrical components need to have a high breakdown voltage. For these reasons, the present inventor found the vehicle shown in JPA' 109 likely to produce a high power generation voltage, that is, a high output voltage, of the generator, which requires that the electrical components have a high breakdown voltage. Here, an output current of the generator is precisely controlled by, for example, turning on/off switching elements that are arranged between the generator and the motor. The switching elements with a high breakdown voltage have a high resistance when they are ON. This leads to a decrease in efficiency due to a heat loss of the switching elements. Electrical components in general, not limited to switching elements, are increased in size as they have a higher breakdown voltage. Thus, there has been a problem of a decrease in efficiency and an increase in size due to a high breakdown voltage.

In the vehicle as shown in JPA' 109, as mentioned above, a change of power generated by the generator is caused mainly by a change of the power generation voltage. Therefore, an attempt to increase or decrease the power generation current involves a large increase or decrease of the power generation voltage. It is therefore difficult to control the current beyond constraints on the engine rotation speed or constraints on the voltage.

As for the engine, for example, there is an option to narrow the range of the rotation speed in order to achieve an improved fuel efficiency and downsizing. In the vehicle as shown in JPA' 109, however, the range of the output voltage of the generator depends on the range of the rotation speed of the engine. Adoption of an engine having a narrowed rotation speed range results in the range of the output voltage of the generator being narrowed in accordance with the range of the engine rotation speed. That is, narrowing the range of the engine rotation speed leads directly to narrowing the range of the motor output. For these reasons, the present inventor found it difficult that both a drive source with a wide rotation speed range and a drive source with a narrow rotation speed range are applied to the generator shown in JPA' 109.

In the vehicle as shown in JPA' 109, moreover, an increase of electric power supplied from the generator to the motor is caused mainly by an increase of the voltage, as described above. The rotation speed of the motor easily increases along with an increase of the voltage, while the output torque of the motor does not easily increase along with an increase of the current. Therefore, an attempt to increase the current supplied from the generator to the motor for the purpose of increasing the output torque of the motor involves an increase of the voltage. An increase of the output torque of the motor inevitably involves an increase of the rotation speed of the motor. For these reasons, the present inventor found it difficult for the generator shown in JPA' 109 to appropriately supply a current to the motor.

The present inventor made further studies on the above-described problems. As a result, the present inventor discovered that the reason why the above-described problems occur in the vehicle as shown in JPA' 109 is that the output is controlled without distinction between the current and voltage (the rotation speed and torque) so that the current and the voltage (the rotation speed and torque) are highly interactive with each other.

For solving the above-described problems, the present inventor further made intensive studies.

It has been believed that an increase of a current outputted from a generator is caused mainly by an increase of a voltage, and this is not unique to the vehicle as shown in JPA' 109. A voltage is increased by, for example, an increase of the rotation speed, an increase of a magnetic force, or an increase of the number of turns of a winding. A current reaches saturation as the rotation speed increases due to an armature reaction. The increase of the magnetic force or the increase of the number of turns of the winding leads to a size increase.

One conceivable way to increase the current outputted from the generator is reducing the armature reaction which is caused by an inductance. It however has been considered that reducing the inductance of a winding leads to reducing a linkage flux, which makes it difficult to increase the current.

The present inventor focused on a magnetic circuit. A magnetic circuit that influences the inductance is a magnetic circuit for a winding. The magnetic circuit for a winding is different from a magnetic circuit that extends from a magnet of a rotor and passes through a winding. The studies conducted by the present inventor were based on clear distinction between the magnetic circuit for a winding and the magnetic circuit that extends from a magnet of a rotor and passes through a winding. The present inventor consequently discovered that a large change of the inductance can be implemented by changing the magnetic resistance of the magnetic circuit for a winding.

As a consequence, the present inventor obtained the following findings in relation to a current supply system configured to receive a rotational driving force from a drive source and supply a current to an electrical load device that requires a current that can be variable. It is possible to reduce interaction between the current and voltage by adjusting the current to be supplied to the electrical load device, the adjustment implemented by changing the inductance of the winding, the change implemented by changing the magnetic resistance of the magnetic circuit for the winding, which passes through a stator core, in accordance with a current requirement of the current supply system.

A current supply system of the present invention is accomplished based on the findings above. The current supply system of the present invention includes a supply current adjustment device configured to change the magnetic resistance of a magnetic circuit for a winding, which passes through a stator core, in accordance with a current requirement of the current supply system. In this way, the supply current adjustment device changes the inductance of the winding, thus adjusting the current to be supplied to the electrical load device. The ratio of a current change to a voltage change obtained when changing the magnetic resistance of the magnetic circuit for the winding, which passes through the stator core, is higher than that obtained when, for example, changing the rotation speed of the drive source. The current supply system of this embodiment is, therefore, able to adjust the current to be supplied to the electrical load device with less interaction between the voltage change and the current change as compared with when, for example, only the rotation speed of the drive source is changed. Accordingly, the current supply system of the present invention is able to solve the problems described above. That is, the present invention provides a current supply system that is capable of downsizing, compatible with both a drive source with a wide rotation speed range and a drive source with a narrow rotation speed range, and able to supply a current appropriately.

In the following, the present invention will be described based on preferred embodiments and with reference to the drawings.

[First Embodiment]

FIG. 1 is a block diagram showing an outline configuration of an apparatus having mounted thereon a current supply system according to a first embodiment of the present invention.

FIG. 1 shows a vehicle V as an example of the apparatus having mounted thereon the current supply system. The vehicle V includes an electric power supply system P. The electric power supply system P includes a current supply system 1, an engine EG, a drive source rotation speed adjustment device EC, and a motor 18. That is, the vehicle V includes the current supply system 1, the engine EG, the drive source rotation speed adjustment device EC, and the motor 18. The vehicle V also includes wheels Wa, Wb, Wc, Wd, a request indication device A, a converter D, and an inverter J.

The motor 18 is connected to drive wheels Wc, Wd among the wheels Wa to Wd. The motor 18 drives the drive wheels Wc, Wd in rotation so that the vehicle V travels. The engine EG is a drive source of the vehicle V. In this embodiment, the engine EG does not directly supply mechanical power to the drive wheels Wc, Wd. Mechanical power outputted from the engine EG is converted into electric power by the current supply system 1. The electric power obtained by the conversion is re-converted into mechanical power by the motor 18.

The engine EG includes an output shaft C. The output shaft C is, for example, a crankshaft. The engine EG drives the output shaft C into rotation by fuel combustion. The engine EG outputs mechanical power in the form of rotation of the output shaft C.

The electric power supply system P includes the engine EG and the current supply system 1. The electric power supply system P supplies electric power to the motor 18. The electric power supply system P functions as a power source. The current supply system 1 included in the electric power supply system P is mechanically connected to the engine EG. The current supply system 1 receives a rotational driving force from the engine EG and supplies a current to the motor 18. The current supply system 1 functions as a generator.

The request indication device A outputs a current request. The request indication device A has an accelerator operator.

More specifically, the request indication device A is operated by a driver of the vehicle V. The request indication device A accordingly outputs a request for acceleration of the vehicle V. The request for acceleration of the vehicle V corresponds to a torque for driving the drive wheels Wc, Wd. The request for acceleration of the vehicle V also serves as an output request requesting an output of the vehicle V. The output of the vehicle V corresponds to an output of the motor 18. The request for acceleration of the vehicle V corresponds to a request for an output torque of the motor 18. The output torque of the motor 18 corresponds to a current supplied to the motor 18.

The current request that the request indication device A outputs to the electric power supply system P corresponds to a request for a current to be supplied to the motor 18. That is, the current request that the request indication device A outputs to the electric power supply system P is a request for a current to be supplied from the electric power supply system P to the motor 18. The request indication device A outputs the current request to the electric power supply system P. To be precise, the request indication device A outputs a signal representing the request.

The vehicle V is driven by the motor 18. The output of the vehicle V corresponds to the output of the motor 18. The output of the motor 18 is based on electric power supplied to the motor 18. An electric power request issued to the electric power supply system P is a request for electric power to be supplied from the electric power supply system P to the motor 18. The request indication device A outputs, as the output request requesting the output of the vehicle V, an electric power request requesting electric power to be supplied to the motor 18, in other words, the electric power request issued to the electric power supply system P. The electric power request includes a voltage request and a current request. In particular, acceleration of the vehicle V corresponds to the output torque of the motor 18. The output torque of the motor 18 is based on the current supplied to the motor 18. The current request issued to the current supply system 1 is a request for a current to be supplied from the current supply system 1 to the motor 18. The request indication device A outputs, as the request for acceleration of the vehicle V, a current request for a current to be supplied to the motor 18, in other words, a current requirement of the current supply system 1. The request indication device A outputs a signal representing the current request.

The current supply system 1 receives a rotational driving force from the engine EG and supplies a current to the motor 18. The current supply system 1 adjusts the current that the current supply system 1 supplies to the motor 18 in accordance with the current request issued to the current supply system 1. In other words, the current supply system 1 adjusts the current to be supplied to the motor 18 in accordance with the current requirement of the current supply system 1.

The engine EG includes the drive source rotation speed adjustment device EC. The drive source rotation speed adjustment device EC controls operations of the engine EG. The drive source rotation speed adjustment device EC adjusts the rotation speed of the output shaft C of the engine EG in accordance with the output request (electric power request) issued by the request indication device A.

The vehicle V includes the converter D and the inverter J. The current supply system 1 supplies a current to the motor 18 via the converter D and the inverter J.

The converter D performs rectification. The converter D converts a three-phase AC outputted from the current supply system 1 into a DC. The converter D has an inverter circuit, for example. The converter D has a three-phase bridge inverter circuit including transistors each corresponding to each of the three phases, for example. It is also possible that the converter D has a bridge circuit including diodes. That is, the converter D may be configured as a rectifier. The converter D may be included in the current supply system 1.

The inverter J supplies to the motor 18 a current for driving the motor 18. The motor 18 is, for example, a three-phase brushless motor. The inverter J converts a DC outputted from the converter D into a three-phase current with phases shifted by 120 degrees corresponding to the three phases of the three-phase brushless motor. The inverter J may be included in the motor 18.

The motor 18 is operated by electric power that is supplied from the current supply system 1 via the converter D and the inverter J. The motor 18 rotates the drive wheels Wc, Wd so that the vehicle V travels.

Instead of the three-phase brushless motor, for example, a DC motor with brushes is also adoptable as the motor 18. In a case where the motor 18 is a DC motor, the inverter J is not provided.

The engine EG represents one example of the drive source of the present invention. The motor 18 represents one example of the electrical load device of the present invention.

In the vehicle V, the electric power supply system P functions as a power source that generates electric power. In the vehicle V, the current supply system 1 in combination with the motor 18 functions as a transmission that transmits an output of the engine EG to the drive wheels Wc, Wd with the torque and the rotation speed varying.

[Current Supply System]

The current supply system 1 includes a rotor 11, a stator 12, and a supply current adjustment device 13. The rotor 11 and the stator 12 constitute a three-phase brushless generator 10. That is, the current supply system 1 functions as a generator.

The rotor 11 includes permanent magnets. To be more specific, the rotor 11 includes a plurality of magnetic pole parts 111 and a back yoke part 112. The magnetic pole part 111 is made of a permanent magnet. The back yoke part 112 is made of, for example, a ferromagnetic material. The magnetic pole parts 111 are arranged between the back yoke part 112 and the stator 12. The magnetic pole parts 111 are attached to the back yoke part 112. The plurality of magnetic pole parts 111 are arranged so as to align in a circumferential direction Z about the rotation axis of the rotor 11, that is, so as to align in the direction of rotation of the rotor 11. The plurality of magnetic pole parts 111 are arranged such that N-poles and S-poles alternate with respect to the circumferential direction Z. The generator 10 is a three-phase brushless generator of permanent magnet type. A winding for supplying a current is not provided on the rotor 11.

The stator 12 is arranged opposed to the rotor 11. The stator 12 includes a plurality of windings 121 and a stator core 122. The stator core 122 is made of, for example, a ferromagnetic material. The stator core 122 forms a magnetic circuit of the stator 12. The plurality of windings 121 are wound on the stator core 122. The stator core 122 includes a core main body 122a (see FIG. 2A) and a plurality of teeth 122b. The core main body 122a functions as a yoke. The plurality of teeth 122b extend from the core main body 122a toward the rotor 11. The plurality of teeth 122b protrude from the core main body 122a toward the rotor 11. The teeth 122b extending toward the rotor 11 have their distal end surfaces opposed to the magnetic pole parts 111 of the rotor 11 with an air gap therebetween. The plurality of teeth 122b, which are arranged at intervals with respect to the circumferential direction Z, align in the circumferential direction Z. Each of the plurality of windings 121 is wound on each of the plurality of teeth 122b. Each of the plurality of windings 121 corresponds to any of the three phases, namely, U-phase, V-phase, and W-phase. The windings 121 corresponding to U-phase, V-phase, and W-phase are arrange in order in the circumferential direction Z.

The rotor 11 is connected to the output shaft C of the engine EG. The rotor 11 is rotated along with rotation of the output shaft C. The rotor 11 has the magnetic pole parts 111 rotating in a state where the magnetic pole parts 111 are opposed to the teeth 122b of the stator core 122. As the rotor 11 rotates, magnetic fluxes linked with the windings 121 change. As a result, an induced voltage is generated in the windings 121. This is how the current supply system 1 generates power. The current supply system 1 supplies the generated current to the motor 18. The current outputted from the current supply system 1 is supplied to the motor 18. More specifically, the current outputted from the current supply system 1 is supplied to the motor 18 via the converter D and the inverter J. As the current outputted from the current supply system 1 increases, the current supplied from the converter D to the inverter J increases, so that the current supplied to the motor 18 increases. The voltage outputted from the current supply system 1 is supplied to the motor 18 via the converter D and the inverter J.

In this embodiment, the rotor 11 and the stator 12 have an axial gap structure. The rotor 11 and the stator 12 are opposed to each other with respect to the direction (axial direction) X of the rotation axis of the rotor 11. The plurality of teeth 122b included in the stator 12 protrude in the axial direction X from the core main body 122a. In this embodiment, the axial direction X is a direction in which the rotor 11 and the stator 12 are opposed to each other.

The supply current adjustment device 13 adjusts the current to be supplied to the motor 18. The supply current adjustment device 13 changes the magnetic resistance of the magnetic circuit for the winding 121, in accordance with the current request issued to the current supply system 1. The magnetic circuit for the winding 121 means a magnetic circuit passing through the stator core 122. Thus, the supply current adjustment device 13 changes the inductance of the winding 121. This is how the supply current adjustment device 13 adjusts the current to be supplied to the motor 18. The magnetic circuit for the winding 121 is, for example, a close-loop circuit. The magnetic circuit for the winding 121 is a circuit that passes through an internal path of the winding 121, then goes out from one end portion (the end portion close to the rotor) of the internal path of the winding 121, then enters one end portion (the end portion close to the rotor) of an internal path of an adjacent winding 121, then passes through the internal path of the adjacent winding 121, then goes out from the other end portion (the end portion remote from the rotor) of the internal path of the adjacent winding 121, and then enters the other end portion (the end portion remote from the rotor) of the internal path of the winding 121. The internal path of the winding 121 is a path provided within the winding 121 so as to extend in the direction in which the rotor 11 and the stator 12 are opposed to each other. The magnetic circuit for the winding 121 partially has a non-magnetic gap such as an air gap. The magnetic circuit for the winding is, for example, made up of the stator core 122 and a non-magnetic gap.

The supply current adjustment device 13 includes a current adjustment mechanism 131 and a current adjustment control device 132.

The current adjustment mechanism 131 is a mechanism for changing the magnetic resistance of the magnetic circuit for the winding 121.

The current adjustment control device 132 controls the current adjustment mechanism 131 in accordance with the current request issued to the current supply system 1. In this embodiment, the current request issued to the current supply system 1 is outputted from the request indication device A. The current adjustment control device 132 controls the current adjustment mechanism 131 in accordance with the current request indicated by the request indication device A. The current adjustment control device 132 represents one example of the control device of the present invention.

The current adjustment control device 132 is constituted of a microcontroller, for example. The current adjustment control device 132 includes a central processing unit (not shown) and a storage device (not shown). The central processing unit performs computational processing based on a control program. The storage device stores programs and data concerning computation. Alternatively, the current adjustment control device 132 may be configured as a wired logic. The current adjustment control device 132 is attached to the current adjustment mechanism 131. It may be also acceptable that the current adjustment control device 132 is arranged in a position remote from the current adjustment mechanism 131. It may be possible that the current adjustment control device 132 doubles as the drive source rotation speed adjustment device EC that controls a combustion operation of the engine EG.

The drive source rotation speed adjustment device EC changes the rotation speed of the rotor 11 by changing the rotation speed of the engine EG. Thus, the drive source rotation speed adjustment device EC adjusts the voltage to be supplied to the motor 18. A change of the rotation speed of the rotor 11 leads to a change of the voltage to be supplied to the motor 18. Here, the change of the rotation speed of the rotor 11 and the adjustment made by the supply current adjustment device 13 are different from each other in how much it contributes to influencing each of the voltage and current to be supplied to the motor 18. Adjustment of the voltage to be supplied to the motor 18 is more readily implemented by changing the rotation speed of the rotor 11.

Figure 2A:
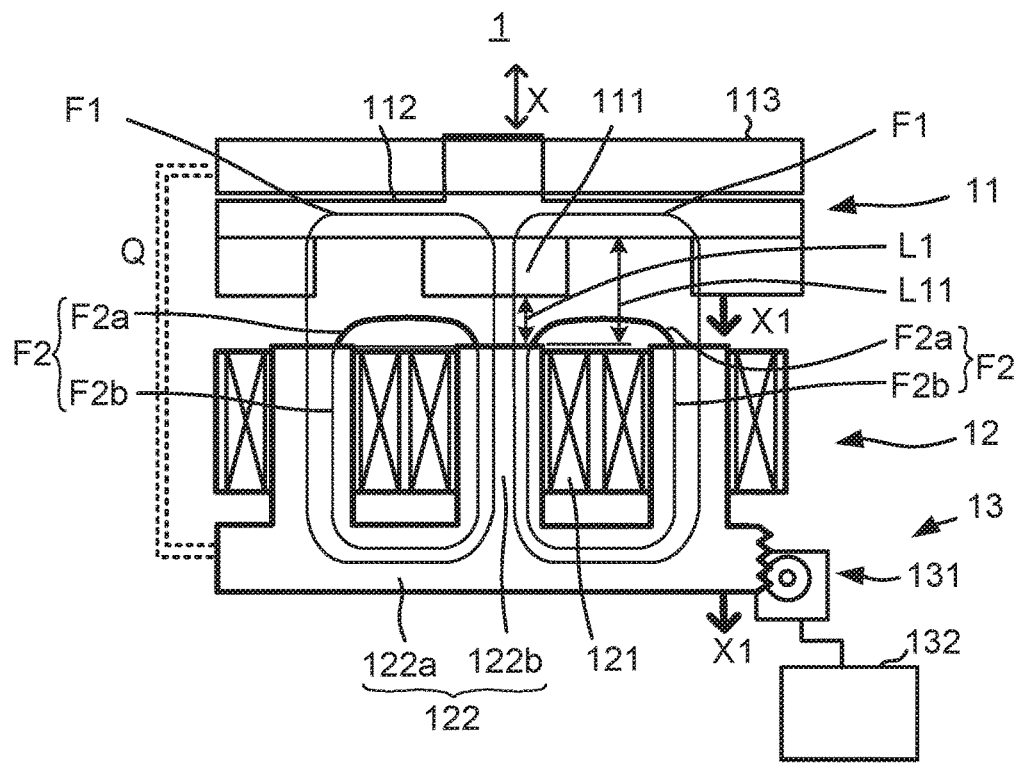
FIG. 2A is a schematic diagram for explanation of adjustment made by a supply current adjustment device in the current supply system shown in FIG. 1.
Figure 2B:
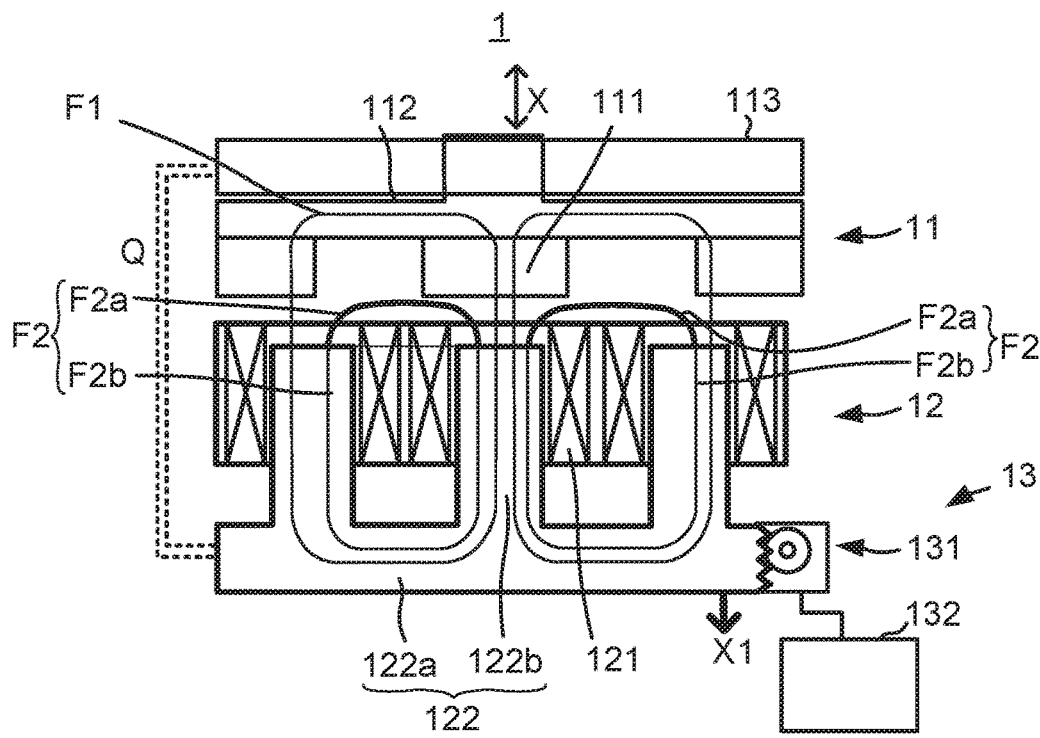
FIG. 2B is a schematic diagram showing a state in which the inductance of a winding is set lower than that of FIG. 2A.

FIG. 2A and FIG. 2B are schematic diagrams for explanation of adjustment made by the supply current adjustment device 13 provided in the current supply system 1 shown in FIG. 1. FIG. 2A shows a state in which the inductance of the winding 121 is set to the highest settable value. FIG. 2B shows a state in which the inductance of the winding 121 is set to a value lower than that of FIG. 2A.

FIG. 2A illustrates a part of the rotor 11 and a part of the stator 12 provided in the current supply system 1. The current supply system 1 of this embodiment includes an SPM (Surface Permanent Magnet) generator. The rotor 11 and the stator 12 are opposed to each other. More specifically, the magnetic pole parts 111 of the rotor 11 and the teeth 122b of the stator core 122 of the stator 12 are opposed to each other with the air gap therebetween. The magnetic pole parts 111 are exposed to the stator 12.

The supply current adjustment device 13 changes the magnetic resistance of a magnetic circuit F2 for the winding 121, which passes through the stator core 122. In this manner, the supply current adjustment device 13 changes the inductance of the winding 121, to adjust the current to be supplied to the motor 18. In more detail, the supply current adjustment device 13 moves the position of the stator core 122 relative to the winding 121. This is how the supply current adjustment device 13 changes the magnetic resistance of the magnetic circuit F2 for the winding 121, which passes through the stator core 122.

The windings 121 are secured to a casing (not shown) of the generator. The stator core 122 is supported on the casing such that the stator core 122 is freely movable in the axial direction X relative to the windings 121. The windings 121 are not secured to the teeth 122b. A gap is ensured between each winding 121 having a cylindrical shape and each tooth 122b. The gap is to such an extent that the tooth 122b is freely movable relative to the winding 121.

The current adjustment mechanism 131 of the supply current adjustment device 13 moves the stator core 122 so as to move the teeth 122b in a direction into and out of the cylindrically wound windings 121. In this embodiment, the current adjustment mechanism 131 moves the stator core 122 in the axial direction X. The current adjustment control device 132 operates the current adjustment mechanism 131 in accordance with the current request.

In FIGS. 2A and 2B, for the purpose of describing the movement of the stator core 122 in an easy-to-understand manner, the current adjustment mechanism 131 is schematically illustrated in the form of a rack-and-pinion mechanism and a motor. Here, mechanisms other than the illustrated one are adoptable as the current adjustment mechanism 131 that moves the stator core 122. For example, a mechanism including a cylindrical member that is arranged concentric with a stator core and in threaded engagement with the stator core is adoptable. Such a mechanism is able to move the stator core in the axial direction X by, for example, rotating the cylindrical member relative to the stator core.

The supply current adjustment device 13 moves the position of the stator core 122 relative to the winding 121 while maintaining the position of the stator core 122 relative to the rotor 11. In FIGS. 2A and 2B, the broken lines Q express that the rotor 11 moves in conjunction with the stator core 122 in the axial direction X. A structure for maintaining the relative position between the rotor 11 and the stator core 122 is implemented by, for example, a bearing part 113 rotatably supporting the rotor 11. The position of the bearing part 113 is fixed relative to the stator core 122.

FIG. 2A and FIG. 2B illustrate primary magnetic fluxes F1 generated by the magnetic pole parts 111. The line of each magnetic flux F1 represents a primary magnetic circuit through which the magnetic flux F1 generated by the magnetic pole part 111 passes. The magnetic circuit through which the magnetic flux F1 passes will be referred to as a magnetic circuit F1.

The primary magnetic flux F1 generated by the magnetic pole part 111 flows through the magnetic pole part 111, the air gap between the magnetic pole part 111 and the tooth 122b, the tooth 122b, the core main body 122a, and the back yoke part 112. In other words, the magnetic circuit F1 is made up of the magnetic pole part 111, the air gap between the magnetic pole part 111 and the tooth 122b, the tooth 122b, the core main body 122a, and the back yoke part 112.

Here, FIG. 2A and FIG. 2B show three teeth 122b among the plurality of teeth 122b arranged in the circumferential direction. For providing plain illustration of the magnetic circuits F1, FIG. 2A and FIG. 2B show a state in which the magnetic pole part 111 is opposed to the middle tooth 122b among the three teeth 122b.

As the rotor 11 rotates, the amount of magnetic flux generated by the magnetic pole part 111 and linked with the winding 121 changes. The change of the amount of magnetic flux linked with the winding 121 causes an induced voltage to occur in the winding 121. That is, power is generated.

The induced voltage caused in the winding 121 depends on the amount of magnetic flux linked with the winding 121. The higher the magnetic resistance of the magnetic circuit F1 is, the smaller the amount of magnetic flux linked with the winding 121 is. The magnetic resistance of the magnetic circuit F1 depends mainly on the magnetic resistance of the air gap between the tooth 122b and the magnetic pole part 111. The magnetic resistance of the air gap between the tooth 122b and the magnetic pole part 111 depends on an air gap length L1 of the air gap between the tooth 122b and the magnetic pole part 111. Hereinafter, a length of a gap refers to a width of the gap.

Accordingly, the induced voltage caused in the winding 121 depends on the air gap length L1 of the air gap between the tooth 122b and the magnetic pole part 111.

FIG. 2A and FIG. 2B illustrate a primary magnetic flux F2 generated by a current flowing in the winding 121. At a time of power generation, a current caused by the induced voltage flows in the winding 121. The magnetic flux F2 is generated by the current flowing in the winding 121 at the time of power generation. The line of each magnetic flux F2 represents a primary magnetic circuit through which the magnetic flux F2 generated by the current in the winding 121 passes. The magnetic circuit through which the magnetic flux F2 passes will be referred to as a magnetic circuit F2. The magnetic circuit F2 is the magnetic circuit for the winding 121. The magnetic circuit F2 for the winding 121 is made up of a path passing through the inside of the winding 121 and providing the minimum magnetic resistance of the entire magnetic circuit F2.

The magnetic circuit F2 passes through the stator core 122. The magnetic circuit F2 passes through adjacent teeth 122b. In the drawing, three teeth 122b among the plurality of teeth 122b arranged in the circumferential direction are shown. The magnetic circuit F2 for the winding 121 wound on the middle tooth 122b among the three teeth 122b is illustrated as a typical example. A magnetic circuit F2 for a certain winding 121 passes through a tooth 122b having the certain winding 121 wound thereon and two teeth 122b adjacent to the certain tooth 122b.

The primary magnetic flux F2 generated by the current in the winding 121 passes through the teeth 122b, the core main body 122a, and the air gap between the two adjacent teeth 122b. In other words, the magnetic circuit F2 is made up of the teeth 122b, the core main body 122a, and the air gap between the two adjacent teeth 122b. The magnetic circuit F2 passing through the stator core 122 includes one air gap. A portion of the magnetic circuit F2 including the air gap is indicated by the bold line. The bold-line portion of the magnetic circuit F2 including the air gap will be simply referred to as an air gap F2a. The air gap F2a exists between the winding 121 and the rotor 11. The air gap F2a included in the magnetic circuit F2 exists between the winding 121 and the rotor 11 and between the adjacent teeth 122b. The air gap F2a is a non-magnetic gap. A portion of the magnetic circuit F2 corresponding to the air gap F2a is provided so as to connect respective portions of the two adjacent teeth 122b opposed to the rotor 11.

The magnetic circuit F2 for the winding 121 includes the air gap F2a between the two adjacent teeth 122b. The magnetic circuit F2 does substantially not include the back yoke part 112 of the rotor 11. Most of the magnetic flux F2 generated by the current in the winding 121 passes through the air gap between the two adjacent teeth 122b without going to the back yoke part 112 of the rotor 11, for the following reasons.

For the magnetic flux F2 generated by the current in the winding 121, the magnetic pole part 111 is considered simply as a magnetic flux path. In this embodiment, the magnetic pole part 111 is made of a permanent magnet whose magnetic permeability is as low as air. The magnetic pole part 111 can therefore be considered as equivalent to air for the magnetic circuit F2. Since the magnetic pole part 111 is equivalent to air, the substantial air gap length of the air gap between the stator 12 and the rotor 11 is equal to a distance L11 from the tooth 122b to the back yoke part 112. The distance L11 from the tooth 122b to the back yoke part 112 includes the thickness of the magnetic pole part 111 with respect to the axial direction X. Thus, the distance L11 is longer than a distance L1 from the tooth 122b to the magnetic pole part 111.

In this embodiment, moreover, the amount of the magnetic flux F2 generated by the current in the winding 121 is smaller than the amount of magnetic flux generated by the permanent magnet of the magnetic pole part 111. Most of the magnetic flux F2 generated by the current in the winding 121 is less likely to reach the back yoke part 112 across the air gap length L11. Little of the magnetic flux F2 generated by the current in the winding 121 passes through the back yoke part 112.

Thus, most of the magnetic flux F2 generated by the current in the winding 121 passes through the air gap F2a between the teeth 122b rather than through the back yoke part 112 of the rotor 11. In the state shown in FIG. 2A, the inductance of the winding 121 is set to the highest settable value. In the state shown in FIG. 2A, the air gap F2a included in the magnetic circuit F2 has the highest magnetic resistance among portions of the magnetic circuit F2. The air gap F2a has a higher magnetic resistance than that of a remaining portion F2b of the magnetic circuit F2 other than the air gap F2a.

The inductance of the winding 121 depends on the magnetic resistance of the magnetic circuit F2 for the winding 121. The inductance of the winding 121 is in reverse proportion to the magnetic resistance of the magnetic circuit F2 for the winding 121.

Here, the magnetic resistance of the magnetic circuit F2 for the winding 121 is the magnetic resistance of the magnetic circuit F2 through which the magnetic flux F2 generated by the current in the winding 121 flows. The magnetic resistance of the magnetic circuit F2 for the winding 121, which passes through the stator core 122, includes the magnetic resistance of the air gap F2a between the two adjacent teeth 122b. In a strict sense, the magnetic flux F2 generated by the current in the winding 121 passes through both the stator 12 and the rotor 11. As described above, however, most of the magnetic flux generated by the current in the winding 121 passes through the air gap F2a between the two adjacent teeth 122b without going to the back yoke part 112 of the rotor 11. Therefore, the magnetic resistance to the winding 121 depends more strongly on the magnetic resistance of the magnetic circuit F2 passing through the stator 12 than on the magnetic resistance of the magnetic circuit F1 passing through the rotor 11. That is, the inductance of the winding 121 depends more strongly on the magnetic resistance of the magnetic circuit F2, which passes through the stator core 122 when viewed from the winding 121 side, than on the magnetic resistance of the magnetic circuit F1, which passes through the rotor 11 when viewed from the winding 121 side. Accordingly, the inductance of the winding 121 substantially depends on the magnetic resistance of the magnetic circuit F2, which passes through the stator core 122 when viewed from the winding 121 side.

The supply current adjustment device 13 moves the relative position of the stator core 122 relative to the windings 121 in accordance with the current request. In this manner, the supply current adjustment device 13 changes the magnetic resistance of the magnetic circuit F2 for the winding 121, which passes through the stator core 122. This is how the supply current adjustment device 13 changes the inductance of the winding 121. For example, in case of the supply current adjustment device 13 moving the stator core 122 in a direction indicated by the arrow X1, the teeth 122*b* of the stator core 122 are moved in the direction out of the cylindrically wound windings 121.

FIG. 2B shows a state having a lower inductance than that of the state shown in FIG. 2A.

Since the teeth 122*b* of the stator core 122 are moved out of the windings 121, the volume of the stator core 122 existing within the windings 121 is reduced. As a result, the magnetic flux within the winding 121 spreads. From the viewpoint of the magnetic circuit F2 for the winding 121, the length of the air gap F2*a* constituting the magnetic circuit F2 increases. This increases the magnetic resistance of the air gap F2*a* between the winding 121 and the rotor 11. That is, the magnetic resistance of the air gap F2*a*, whose magnetic resistance is highest, increases. As a result, the magnetic resistance of the magnetic circuit F2 for the winding 121, which passes through the stator core 122, increases. Consequently, the inductance of the winding 121 decreases.

The supply current adjustment device 13 changes the magnetic resistance of the air gap F2*a* whose magnetic resistance is highest. Thus, the supply current adjustment device 13 changes the magnetic resistance of the magnetic circuit F2 passing through the adjacent teeth 122*b*. This can cause a larger change of the inductance of the winding 121 as compared with, for example, changing the magnetic resistance of a portion other than the air gap F1*a*.

Furthermore, the supply current adjustment device 13 changes the inductance of the winding 121 such that the change rate of the inductance of the winding 121 is higher than the change rate of the magnetic flux linked with the winding 121. This is how the supply current adjustment device 13 adjusts the current. The supply current adjustment device 13 of the current supply system 1 according to this embodiment moves the position of the stator core 122 relative to the windings 121 while maintaining the position of the stator core 122 relative to the rotor 11.

As the supply current adjustment device 13 moves the stator core 122 in the direction of the arrow X1, the rotor 11 is accordingly moved in the direction of the arrow X1. Therefore, the position of the stator core 122 relative to the rotor 11 is maintained.

Since the position of the stator core 122 relative to the rotor 11 is maintained, a change of the air gap length L1 between the teeth 122*b* and the magnetic pole parts 111 is suppressed, which otherwise might be caused by movement of the stator core 122. Accordingly, a change of the magnetic flux F1 flowing from the magnetic pole part 111 to the stator core 122 is suppressed. That is, a change of the magnetic flux F1 linked with the winding 121 is suppressed.

Figure 3:
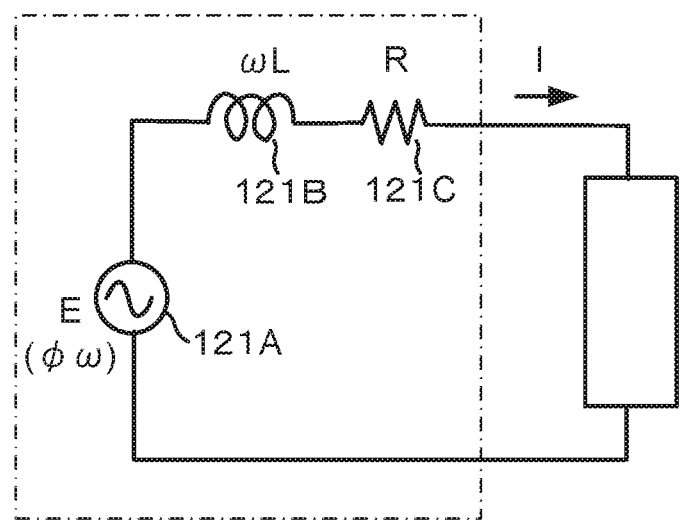
FIG. 3 is a circuit diagram schematically showing an equivalent circuit of a winding of the supply current adjustment device shown in FIGS. 2A and 2B.

FIG. 3 is a circuit diagram schematically showing an equivalent circuit of the winding 121 of the supply current adjustment device 13 shown in FIG. 2A.

As shown in FIG. 3, the winding 121 (see FIGS. 2A and 2B) in an electrical sense includes an AC voltage source 121A, an inductor 121B, and a resistance 121C.

The AC voltage source 121A outputs an induced voltage E which depends mainly on the product of the rotation speed ω of the rotor 11 and a magnetic flux Φ linked with the winding 121 which means the magnetic flux F1. An inductance L of the inductor 121B depends mainly on the magnetic resistance of the magnetic circuit F2 for the winding 121, which passes through the stator 12. A resistance value R of the resistance 121C is a winding resistance. Impedance of the winding 121 is schematically expressed as $((\omega L)^2 + R^2)^{1/2}$.

The supply current adjustment device 13 moves the relative position of the stator core 122 relative to the winding 121 in accordance with the current request. Thus, the supply current adjustment device 13 changes the magnetic resistance of the magnetic circuit F2 for the winding 121, which passes through the stator core 122. Thus, the supply current adjustment device 13 changes the inductance L of the winding 121. The change of the inductance L leads to a change of the impedance. As a result, the current to be supplied from the current supply system 1 is adjusted.

The supply current adjustment device 13 adjusts the current by changing the inductance of the winding 121 such that the change rate of the magnetic flux Φ linked with the winding 121 is lower than the change rate of the inductance L of the winding 121. This is how the supply current adjustment device 13 adjusts a current I. Accordingly, the current is adjusted with less change of the induced voltage E.

Instead of making adjustment by the supply current adjustment device 13, changing the output (rotational power) of the engine EG is also conceivable as a method for adjusting the current to be supplied from the current supply system 1 in the vehicle V. The drive source rotation speed adjustment device EC changes the rotation speed of the engine EG, to change the rotation speed ω of the rotor 11, so that the voltage to be supplied to the motor 18 is adjusted.

The output (rotational power) of the engine EG mainly changes the rotation speed of the output shaft C, that is, the rotation speed ω of the rotor 11. The rotation speed ω of the rotor 11 influences both the induced voltage E of the winding 121 and the impedance $((\omega L)^2 + R^2)^{1/2}$. Therefore, adoption of only the method of changing the rotation speed of the output shaft C of the engine EG cannot avoid high interaction between the supply voltage and the supply current.

In this respect, the current supply system 1 moves the position of the stator core 122 relative to the winding 121 in accordance with the current request, to change the magnetic resistance of the magnetic circuit F2 for the winding 121, which passes through the stator core 122. As a result, the inductance of the winding 121 is changed. Therefore, the ratio of a current change to a voltage change obtained when changing the magnetic resistance of the magnetic circuit F2 for the winding 121 is different from that obtained when changing the rotation speed ω of the rotor 11. The current supply system of this embodiment is able to adjust the current to be supplied to the electrical load device with less interaction between the voltage change and the current change as compared with when, for example, only the rotation speed of the output shaft C of the engine EG is changed by the drive source rotation speed adjustment device EC.

For example, the supply current adjustment device 13 of this embodiment moves the position of the stator core 122 relative to the winding 121 while maintaining the position of the stator core 122 relative to the rotor 11. This enables the current to be adjusted while less influenced by voltage constraints.

The supply current adjustment device 13 is able to adjust the current while less influenced by voltage constraints. It is compatible with both the engine EG with a wide rotation speed range and the engine EG with a narrow rotation speed range, and able to supply a current more appropriately.

In the current supply system 1, for example, the supply current adjustment device 13 increases the magnetic resistance of the magnetic circuit F2 for the winding 121 in accordance with a request for increasing the current. Thus, the supply current adjustment device 13 reduces the inductance of the winding 121. As a result, the current to be supplied to the motor 18 serving as the electrical load device can be increased.

The supply current adjustment device 13 changes the inductance of the winding 121 by changing the magnetic resistance of the air gap F2a existing between the winding 121 and the rotor 11. The magnetic pole part 111 moving along with rotation of the rotor 11 causes an alternating magnetic field to occur between the winding 121 and the rotor 11. For example, reducing the magnetic resistance of the air gap F2a between the winding 121 and the rotor 11 leads to a reduction of an alternating magnetic field loss. To be exact, a core loss in the magnetic circuit F2 passing through the air gap F2a is reduced. The reduction of the loss allows a higher current to be outputted. Accordingly, the current to be supplied to the motor 18 serving as the electrical load device can be adjusted to an increased degree.

The current supply system 1 changes the magnetic resistance of the magnetic circuit F2 for the winding 121, which passes through the stator core 122, to change the inductance of the winding 121, thus adjusting the current to be supplied to the motor 18. Accordingly, the current supply system 1 is able to adjust the current to be supplied to the motor 18 with suppression of increase in the thickness of the winding 121 and the amount of magnet. This allows downsizing of the current supply system 1 itself.

In this embodiment, a movement of the relative position of the stator core 122 relative to the winding 121 causes a change of the magnetic resistance of the magnetic circuit F2 for the winding 121. As a result, the inductance L of the winding 121 is changed, so that the current is adjusted. This embodiment can gradually change the inductance L because the change of the inductance L is implemented by a change of the magnetic resistance of the magnetic circuit F2 for the winding 121, which passes through the stator core 122.

Instead of changing the magnetic resistance of the magnetic circuit for the winding which passes through the stator core, changing the substantial number of turns of the winding is also conceivable as a method for changing the inductance. For example, it is conceivable that a terminal provided at an end of the winding and a terminal provided in the middle of the winding are selectively switched for use as a current output terminal. It is also conceivable that a terminal provided in the middle of the winding is short-circuited to another terminal. This changes the substantial number of turns which affect the current. As a result, the inductance is changed.

Here, in a case of changing the substantial number of turns of the winding, such a change of the substantial number of turns is caused significantly and instantaneously. Therefore, an excessive voltage occurs in the winding. In addition, an excessive current is likely to flow in a short time. In a case of changing the substantial number of turns, it is required that a switching element for switching the current is provided. Furthermore, the switching element needs to have a high breakdown voltage in order to withstand the excessive voltage. The winding needs to be made of a thick wire in order to deal with a change of the excessive current. For these reasons, changing the substantial number of turns of the winding is less efficient. In addition, it involves a size increase of the system.

In this embodiment, the magnetic resistance of the magnetic circuit F2 passing through the stator core 122 is changed, so that the inductance L of the winding 121 is changed. Thus, the inductance L of the winding 121 can be changed gradually. This can suppress a rapid increase of the voltage occurring in the winding 121. It is therefore possible that a component having a low breakdown voltage is connected to the current supply system 1. This provides a high efficiency. This also eliminates the need to provide the switching element for switching the current. This also allows use of a relatively thin wire for the winding. A size increase of the current supply system 1 is suppressed.

In this manner, the current supply system 1 is capable of downsizing, compatible with both the engine EG with a wide rotation speed range and the engine EG with a narrow rotation speed range, and able to supply a current appropriately.

The electric power supply system P (see FIG. 1) including the current supply system 1 adjusts electric power by both the drive source rotation speed adjustment device EC and the supply current adjustment device 13.

Adjustment made by the drive source rotation speed adjustment device EC changes both the current and voltage. Adjustment made by the supply current adjustment device 13 changes both the current and voltage, too. The change of the rotation speed of the rotor 11 caused by the drive source rotation speed adjustment device EC is different than the adjustment made by the supply current adjustment device 13, in how much it contributes to influencing each of the voltage and current to be supplied to the motor 18. The change of the rotation speed of the rotor 11 has more influence on the voltage to be supplied to the motor 18 than the adjustment made by the supply current adjustment device 13 does. The voltage to be supplied to the motor 18 is easily adjustable by changing the rotation speed of the rotor 11. Since the current supply system 1 of this embodiment is able to enhance separation between the adjustment of the current to be supplied to the electrical load device and the adjustment of the voltage to be supplied to the electrical load device, an adjustment responding to each of the current request and the voltage request can be made.

[Second Embodiment]

Next, a second embodiment of the present invention will be described. In the description of the second embodiment given below, differences from the first embodiment illustrated above will be mainly described.

Figure 4A:
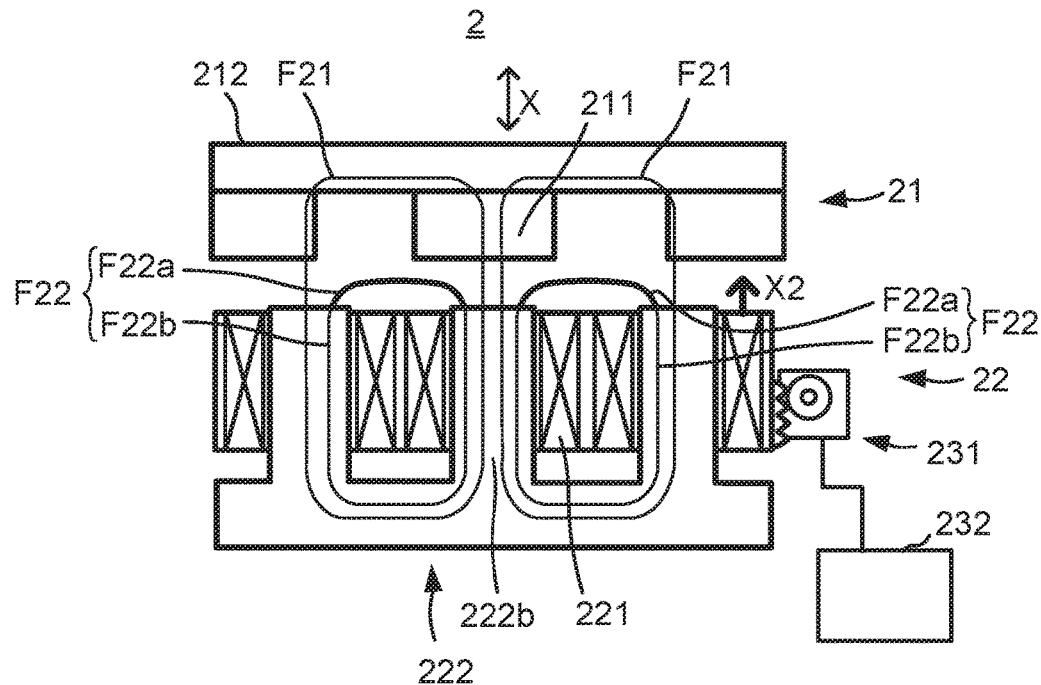
FIG. 4A is a schematic diagram for explanation of adjustment made by a supply current adjustment device in a current supply system according to a second embodiment.
Figure 4B:
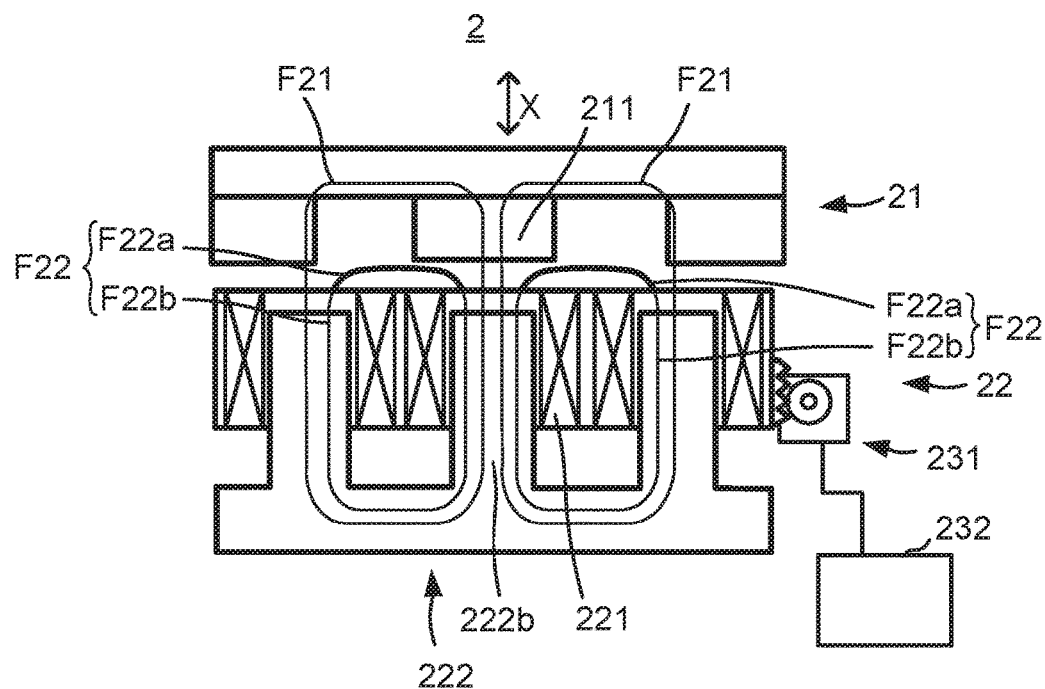
FIG. 4B is a schematic diagram showing a state in which the inductance of a winding is set lower than that of FIG. 4A.

FIG. 4A and FIG. 4B are schematic diagrams for explanation of adjustment made by a supply current adjustment device provided in a current supply system according to the second embodiment. FIG. 4A shows a state in which the inductance of the winding 221 is set to the highest settable value. FIG. 4B shows a state in which the inductance of the winding 221 is set to a value lower than that of FIG. 4A.

The positional relationship among windings 221, a stator core 222, and a rotor 21 shown in FIG. 4A is the same as the positional relationship thereamong in the first embodiment having been described with reference to FIG. 2A.

A magnetic circuit F21 is a magnetic circuit through which a magnetic flux generated by a magnetic pole part 211 passes. A magnetic circuit F22 is a magnetic circuit for the winding 221. The magnetic circuit F22 for the winding 221 is made up of a path passing through the inside of the winding 221 and providing the minimum magnetic resistance of the entire magnetic circuit F22. The magnetic circuit F22 passes through the stator core 222. The magnetic circuit F22 passes through two adjacent teeth 222b.

The magnetic circuit F22 passing through the stator core 222 includes an air gap F22a. The air gap F22a exists between the winding 221 and the rotor 21. The air gap F22a included in the magnetic circuit F22 exists between the winding 221 and the rotor 21 and between the two adjacent teeth 222b. The air gap F22a is a non-magnetic gap. The air gap F22a included in the magnetic circuit F22 is provided so as to connect respective portions of the two adjacent teeth 222b opposed to the rotor 21.

The magnetic circuit F22 for the winding 221 does not pass through a back yoke part 212 of the rotor 21. The magnetic circuit F22 for the winding 221 includes the air gap F22a between the two adjacent teeth 222b.

In the state shown in FIG. 4A, the air gap F22a included in the magnetic circuit F22 has the highest magnetic resistance among portions of the magnetic circuit F22. The air gap F22a has a higher magnetic resistance than that of a remaining portion F22b of the magnetic circuit F22 other than the air gap F22a.

In a current supply system 2 shown in FIG. 4A, a supply current adjustment device 23 moves the windings 221 in accordance with a current request issued to the current supply system 2. Thus, the supply current adjustment device 23 changes the magnetic resistance of the magnetic circuit F22 for the winding 221. Thus, the supply current adjustment device 23 changes the inductance of the winding 221, to adjust the current to be supplied to the motor 18 (see FIG. 1).

The supply current adjustment device 23 moves the windings 221 without moving the stator core 222.

More specifically, the stator core 222 is secured to a casing (not shown). The rotor 21 is rotatably supported on the casing. The rotor 21 is secured with respect to the axial direction X. The windings 221 are supported on the casing such that the windings 221 are freely movable in the axial direction X relative to the casing.

A current adjustment mechanism 231 of the supply current adjustment device 23 moves the windings 221 in the direction that causes the teeth 222b to move into and out of the cylindrical shapes of the windings 221. In this embodiment, the current adjustment mechanism 231 moves the windings 221 in the axial direction X. The current adjustment mechanism 231 moves the windings 221 in a direction indicated by the arrow X2, for example. All the windings 221 wound on the teeth 222b are moved integrally. A current adjustment control device 232 operates the current adjustment mechanism 231 in accordance with the current request.

FIG. 4B shows a state having a lower inductance than that of the state shown in FIG. 4A. The state shown in FIG. 4B is a state after the windings 221 are moved in the direction of the arrow X2.

In this embodiment, the supply current adjustment device 23 moves the windings 221 alone. In this manner, the supply current adjustment device 23 moves the position of the stator core 222 relative to the windings 221 in accordance with the current request. Thus, the supply current adjustment device 23 changes the magnetic resistance of the magnetic circuit F22 for the winding 221, which passes through the stator core 222.

For example, when the windings 221 are moved in the direction of the arrow X2, that is, toward the rotor 21, the teeth 222b of the stator core 222 are pulled out of the windings 221. Pulling the teeth 222b out of the windings 221 reduces the volume of the stator core 222 existing within the windings 221. As a result, the length of the air gap F22a included in the magnetic circuit F22 for the winding 221 increases. This increases the magnetic resistance of the air gap F22a between the winding 221 and the rotor 21. That is, the magnetic resistance of the air gap F22a, which has the highest magnetic resistance, is increased. As a result, the magnetic resistance of the magnetic circuit F22 for the winding 221 increases. Consequently, the inductance of the winding 221 decreases.

The supply current adjustment device 23 changes the magnetic resistance of the air gap F22a whose magnetic resistance is highest. Thus, the supply current adjustment device 23 changes the magnetic resistance of the magnetic circuit F22 passing through the adjacent teeth 222b. Accordingly, a larger change of the inductance of the winding 221 is likely to occur as compared with, for example, changing the magnetic resistance of the portion F22b other than the air gap F22a.

In this manner, the supply current adjustment device 23 changes the inductance of the winding 221. Therefore, the current supply system 2 is capable of downsizing, compatible with both the engine EG with a wide rotation speed range and the engine EG with a narrow rotation speed range, and able to supply a current appropriately, similarly to the first embodiment.

In the current supply system 2, for example, the supply current adjustment device 23 increases the magnetic resistance of the magnetic circuit F22 for the winding 221 in accordance with a request for increasing the current. Thus, the supply current adjustment device 23 reduces the inductance of the winding 221. As a result, the current to be supplied to the motor 18 (see FIG. 1) serving as the electrical load device can be increased.

The supply current adjustment device 23 changes the inductance of the winding 221 by changing the magnetic resistance of the air gap F22a existing between the winding 221 and the rotor 21. This results in a reduction of an alternating magnetic field loss. Accordingly, the current to be supplied to the motor 18 serving as the electrical load device can be adjusted to an increased degree.

Furthermore, the current supply system 2 of this embodiment, which moves the windings 221 alone, is able to move the position of the stator core 222 relative to the windings 221 while maintaining the position of the stator core 222 relative to the rotor 21.

[Third Embodiment]

Next, a third embodiment of the present invention will be described. In the description of the third embodiment given below, differences from the first embodiment illustrated above will be mainly described.

Figure 5:
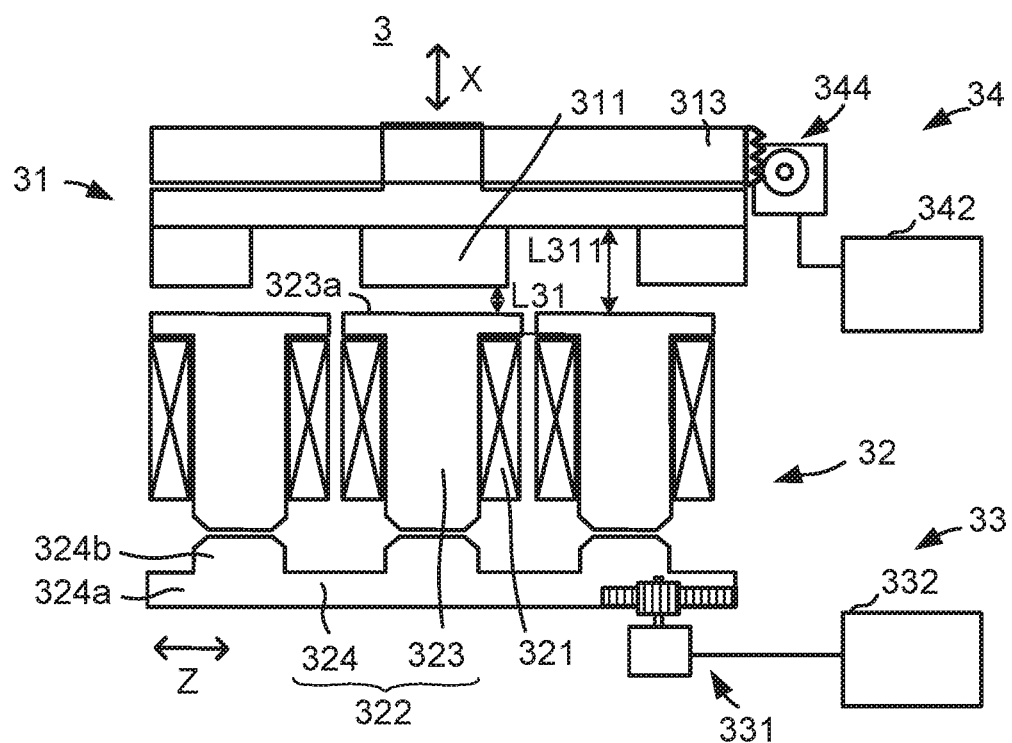
FIG. 5 is a schematic diagram showing a current supply system according to a third embodiment.

FIG. 5 is a schematic diagram showing a current supply system according to the third embodiment.

A current supply system 3 shown in FIG. 5 is provided with a stator core 322 including a plurality of first stator core parts 323 and a second stator core part 324.

Each of the plurality of first stator core parts 323 is provided with a facing portion 323a that opposes the rotor 31 with an air gap therebetween. The plurality of first stator core parts 323 are annularly arranged at intervals. That is, the plurality of first stator core parts 323 align in the circumferential direction Z. The plurality of first stator core parts 323 function as primary teeth in the stator 32. In the specification herein, the first stator core parts 323 may also be referred to as first teeth 323. The length of the facing portion 323a of the first stator core part 323 with respect to the circumferential direction Z is longer than the length of any portion of the first stator core part 323 other than the facing portion 323a with respect to the circumferential direction Z. A winding 321 is wound on each of the first stator core parts 323.

The second stator core part 324 is arranged at a position opposite to the rotor 31 across the first stator core parts 323. The first stator core parts 323 are arranged between the second stator core part 324 and the rotor 31. The second stator core part 324 is not provided with the facing portion 323a that opposes the rotor 31. The second stator core part 324 includes a stator yoke portion 324a having an annular shape and a plurality of second teeth 324b. The second teeth 324b protrude from the stator yoke portion 324a and toward the first stator core part 323. The number of the second teeth 324b is equal to the number of the first stator core parts 323. The stator yoke portion 324a and the second teeth 324b are magnetically coupled. The second teeth 324b may be formed integral with the stator yoke portion 324a. Alternatively, the second teeth 324b may be formed separate from the stator yoke portion 324a such that they are attachable to the stator yoke portion 324a. The second teeth 324b are arranged so as to align in the circumferential direction Z. The second teeth 324b are annularly arranged at intervals equal to the intervals of the first stator core parts 323.

A supply current adjustment device 33 of the current supply system 3 of this embodiment moves the position of a part of the stator core 322 relative to the winding 321. The supply current adjustment device 33 moves one of the first stator core parts 323 and the second stator core part 324 relative to the other. In this manner, the supply current adjustment device 33 changes the magnetic resistance of a magnetic circuit F32 for the winding 321. This is how the supply current adjustment device 33 adjusts the current to be supplied to the motor 18.

A current adjustment mechanism 331 is controlled by a current adjustment control device 332. More specifically, the first stator core parts 323 are secured to a casing (not shown). The second stator core part 324 is supported so as to be rotatable in the circumferential direction Z. The current adjustment mechanism 331 of the supply current adjustment device 33 rotates the second stator core part 324 in the circumferential direction Z about the rotation axis of the rotor 31. In this manner, the current adjustment mechanism 331 moves the second stator core part 324 from a first state (see FIG. 6A) to a second state (see FIG. 6B).

Figure 6A:
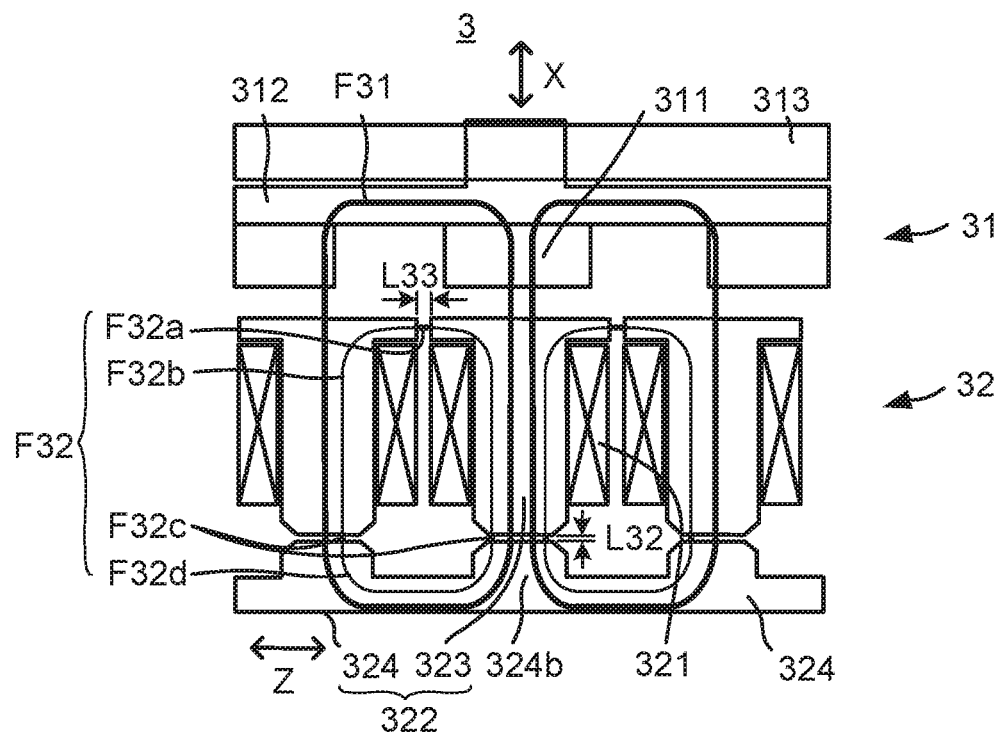
FIG. 6A is a schematic diagram showing a first state of a stator shown in FIG. 5.
Figure 6B:
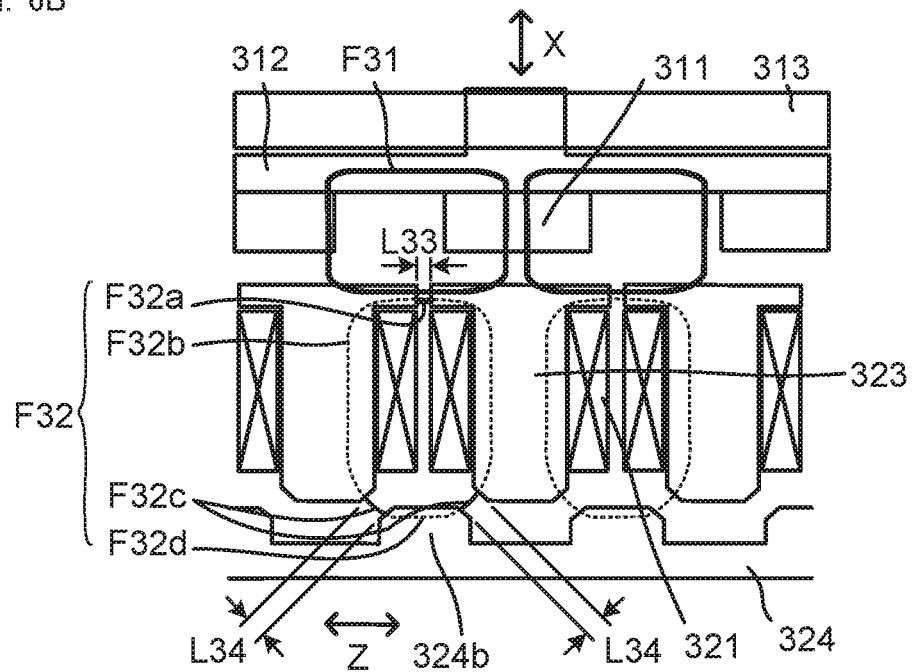
FIG. 6B is a schematic diagram showing a second state of the stator shown in FIG. 5.

FIG. 6A is a schematic diagram showing that the stator 32 illustrated in FIG. 5 is in the first state. FIG. 6B is a schematic diagram showing that the stator 32 illustrated in FIG. 5 is in the second state.

In the state shown in FIG. 6A, the inductance of the winding 321 is set to the highest settable value. In the state shown in FIG. 6B, the inductance of the winding 321 is set to a value lower than that of FIG. 6A.

In the first state shown in FIG. 6A, each of the plurality of second teeth 324b is positioned with respect to the circumferential direction Z so as to confront each of the plurality of first stator core parts 323. In the first state, an air gap length L32 between each of the plurality of first stator core parts 323 and the second stator core part 324 is shorter than an air gap length L33 between adjacent ones of the plurality of first stator core parts 323. To be exact, the air gap length L33 is the length of an air gap formed between respective portions of the first stator core parts 323, each of the portions arranged between the winding 321 and the rotor 31 with respect to a direction in which the rotor 31 and the stator 32 are opposed to each other.

In the second state shown in FIG. 6B, each of the plurality of second teeth 324b is positioned between adjacent ones of the first stator core parts 323 with respect to the circumferential direction Z. In the second state, an air gap length L34 between each of the plurality of first stator core parts 323 and the second stator core part 324 is longer than the air gap length L33 between adjacent ones of the plurality of first stator core parts 323.

Adjustment made by the supply current adjustment device 33 of the current supply system 3 according to the third embodiment will be described.

FIG. 6A and FIG. 6B illustrate a magnetic circuit F31 through which a magnetic flux generated by a magnetic pole part 311 passes, and the magnetic circuit F32 for the winding 321. The magnetic circuit F32 for the winding 321 is made up of a path passing through the inside of the winding 321 and providing the minimum magnetic resistance of the entire magnetic circuit F32. The magnetic circuit F32 passes through the stator core 322. The magnetic circuit F32 passes through adjacent first stator core parts 323 (first teeth 323).

The magnetic circuit F32 includes three air gaps. A portion of the magnetic circuit F32 corresponding to an air gap between the two adjacent first stator core parts 323 (first teeth 323) will be referred to as an air gap F32a. Portions of the magnetic circuit F32 corresponding to air gaps each between each of the two adjacent first stator core parts 323 (first teeth 323) and the second stator core part 324 will be referred to as air gaps F32c. The air gap F32a between the two adjacent first stator core parts 323 (first teeth 323) exists between the winding 321 and the rotor 31. The air gap F32a included in the magnetic circuit F32 exists between the winding 321 and the rotor 321 and between the two adjacent first stator core parts 323 (first teeth 323). The air gap F32a is provided so as to connect mutually opposed end surfaces of the respective two adjacent first stator core parts 323 (first teeth 323).

In the first state shown in FIG. 6A, the air gap length L32 between each of the plurality of first stator core parts 323 (first teeth 323) and the second stator core part 324 is shorter than the air gap length L33 between adjacent ones of the plurality of first stator core parts 323 (first teeth 323). The air gap length L33 is the largest air gap length in the magnetic circuit F32. In the first state, therefore, the air gap F32a between the adjacent first stator core parts 323 has the highest magnetic resistance among portions of the magnetic circuit F32 for the winding 321. The magnetic resistance of the air gap F32a is higher than the magnetic resistance of any of remaining portions F32b, F32c, and F32d of the magnetic circuit F32 other than the air gap F32a. The magnetic resistance of the air gap F32a is higher than the magnetic resistance of the air gap F32c between the first stator core part 323 and the second stator core part 324.

A magnetic flux F32 generated by the current in the winding 321 flows through the adjacent first stator core parts 323 and the second stator core part 324, as shown in FIG. 6A. The magnetic resistance of the magnetic circuit F32 for the winding 321 depends on the air gap length L33 between the adjacent first stator core parts 323.

The magnetic flux F31 generated by the magnetic pole part 311 passes through the two adjacent first stator core parts 323. In more detail, the magnetic flux F31 passes through one magnetic pole part 311, a gap between the magnetic pole part 311 and the first stator core part 323, the first stator core part 323, the second stator core part 324, an adjacent first stator core part 323, a gap between the first stator core part 323 and the magnetic pole part 311, an adjacent magnetic pole part 311, and the back yoke part 312. In the first state shown in FIG. 6A, the magnetic flux F31 of the magnetic pole part 311 passes through the two adjacent first stator core parts 323 and the second stator core part 324.

In the second state shown in FIG. 6B, the air gap length L34 between each of the plurality of first stator core parts 323 and the second stator core part 324 is longer than the air gap length L33 between adjacent ones of the plurality of first stator core parts 323. Therefore, the magnetic resistance of the magnetic circuit F32 for the winding 321, which passes through the stator core 322, is influenced by the air gap length L34 between the first stator core part 323 and the second stator core part 324. As a result, in the second state, the magnetic resistance of the magnetic circuit F32 for the winding 321, which passes through the stator core 322, is higher than the magnetic resistance in the first state.

The magnetic flux F31 generated by the magnetic pole part 311 passes through one magnetic pole part 311, the gap between the magnetic pole part 311 and the first stator core part 323, and the first stator core part 323. The magnetic flux F31 flows from the first stator core part 323 directly to the adjacent first stator core part 323. The magnetic flux F31 generated by the magnetic pole part 311 passes through a gap between the two adjacent first stator core parts 323. In the second state, the path of the magnetic flux F31 generated by the magnetic pole part 311 is switched as described above. In the second state, even if the path of the magnetic flux F31 is not switched, at least a portion of the magnetic flux F31 generated by the magnetic pole part 311 is increased, the portion passing through the gap between the two adjacent first stator core parts 323. The increase of the portion of the magnetic flux F31 passing through the gap between the two adjacent first stator core parts 323 leads to a substantial increase of the magnetic resistance of the air gap F32a. This is, in a magnetic sense, equivalent to an increase of the air gap length L33 between the two adjacent first stator core parts 323. Thus, the magnetic resistance of the magnetic circuit F32 including the air gap F32a is further increased. The change rate of the inductance of the winding 321 is higher than the change rate of the magnetic flux that is generated by the magnetic pole part 311 and linked with the winding 321.

As described above, the inductance of the winding 321 is liable to be in reverse proportion to the magnetic resistance for the winding 321. Therefore, the inductance of the winding 321 in the second state is lower than the inductance of the winding 321 in the first state.

The supply current adjustment device 33 moves one of the first stator core parts 323 and the second stator core part 324 relative to the other so as to shift from the first state (see FIG. 6A) to the second state (see FIG. 6B) in accordance with the request for increasing the current. In this manner, the supply current adjustment device 33 changes the magnetic resistance of the magnetic circuit F32 for the winding 321. Thus, the supply current adjustment device 33 changes the inductance of the winding 321. This is how the supply current adjustment device 33 adjusts the current to be supplied to the motor 18 (see FIG. 1).

The supply current adjustment device 33 changes the magnetic resistance of the air gap F32a. The supply current adjustment device 33 changes the magnetic resistance of the air gap F32a without changing the air gap length L33 between the first stator core parts 323 serving as the adjacent teeth. Thus, the supply current adjustment device 33 changes the magnetic resistance of the magnetic circuit F32 passing through the first stator core parts 323 serving as the adjacent teeth. In the first state, the air gap F32a has the highest magnetic resistance among portions of the magnetic circuit F32. Therefore, a change of the inductance of the winding 321 can be greater than that obtained when, for example, changing the magnetic resistance of portions other than the air gap F32a.

The supply current adjustment device 33 changes the inductance of the winding 321 by changing the magnetic resistance of the air gap F32a existing between the winding 321 and the rotor 31. This results in a reduction of an alternating magnetic field loss. Accordingly, the current to be supplied to the motor 18 serving as the electrical load device can be adjusted to an increased degree.

Figure 7:
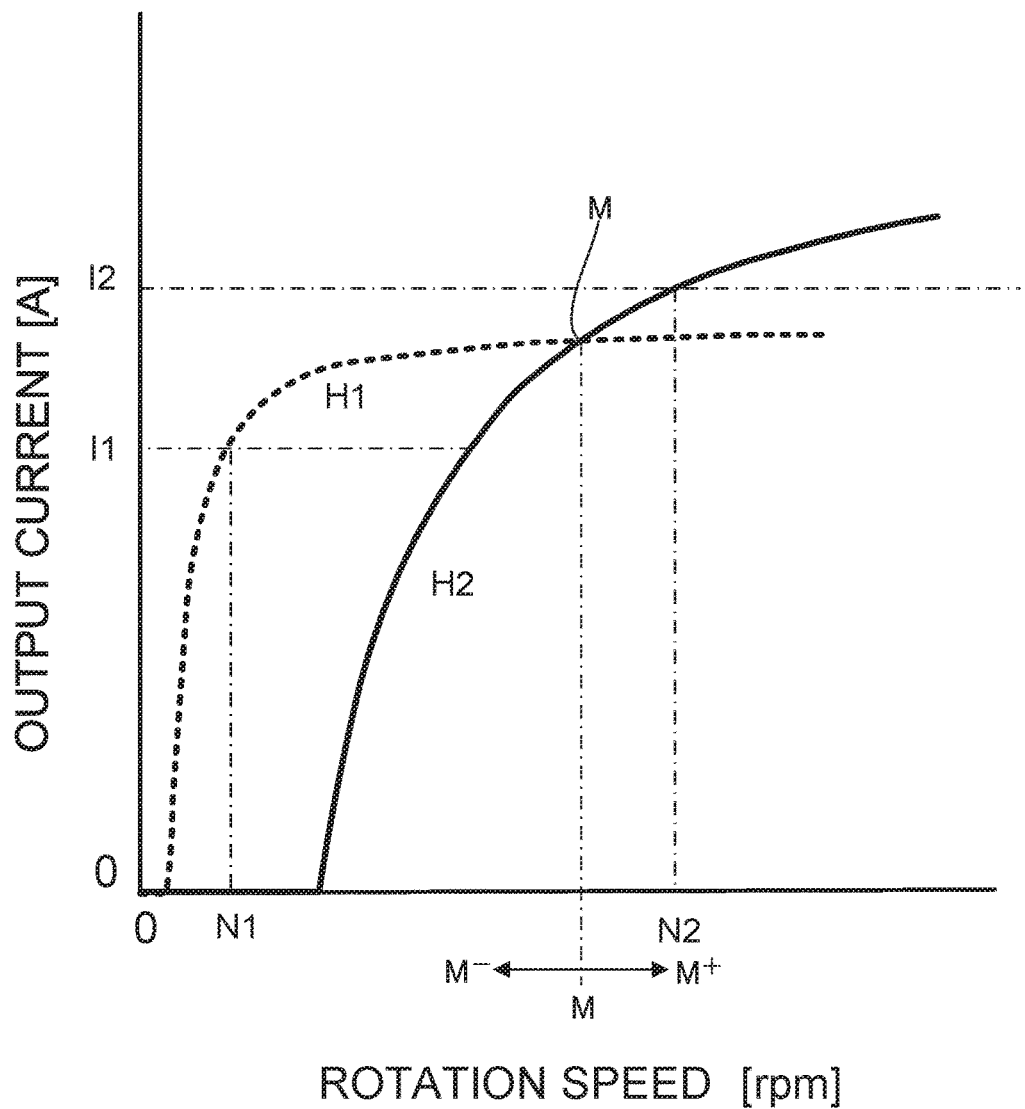
FIG. 7 is a graph showing output current characteristics relative to the rotation speed of a rotor of the current supply system shown in FIG. 5.

FIG. 7 is a graph showing output current characteristics relative to the rotation speed of the rotor 31 of the current supply system 3 shown in FIG. 5.

In the graph of FIG. 7, the broken line H1 represents the output current characteristics in the first state shown in FIG. 6A. In a case of the current supply system 3 having the output current characteristics represented by the broken line H1, the current supply system 3 operates in such a manner that the combination of the output current and the rotation speed locates in a region on or below the broken line H1 in the graph of FIG. 7. The solid line H2 represents the output current characteristics in the second state shown in FIG. 6B. In a case of the current supply system 3 having the output current characteristics represented by the solid line H2, the current supply system 3 operates in such a manner that the combination of the output current and the rotation speed locates in a region on or below the solid line H2. Here, the graph of FIG. 7 shows the characteristics obtained when a supply voltage adjustment device 34 (see FIG. 5) is not operated, for describing a current control in an easy-to-understand manner.

The adjustment made in the current supply system 3 will be described with reference to the graph of FIG. 7.

Focusing on the output current obtained in the first state represented by the broken line H1, the output current increases as the rotation speed increases. The rotation speed of the rotor 31 is, therefore, also usable to adjust the output current of the current supply system 3. The rotation speed of the rotor 31 corresponds to the rotation speed of the output shaft C (see FIG. 1) of the engine EG.

In the first state, the increase of the output current in accordance with the increase of the rotation speed is steep in a region where the rotation speed of the rotor 31 is relatively low. In the first state, the increase of the output current in accordance with the increase of the rotation speed is gentle in a region where the rotation speed is relatively high. That is, the change rate of the output current relative to the change of the rotation speed is low in the region where the rotation speed is relatively high.

For example, if the current supply system 3 is fixed in the first state, a significant increase of the rotation speed of the rotor 31 is required in order to increase the output current in a region where the change rate of the output current is low relative to the change of the rotation speed.

For example, the vehicle V (see FIG. 1) traveling at a high speed requires a further torque of the motor 18 when the vehicle starts uphill traveling or overtakes another vehicle during traveling. A request for an increased current is issued in such a situation.

If the request for an increased current for achieving further acceleration is issued while the state of the supply current adjustment device 33 is fixed, a further increase of the rotation speed of the rotor 31, which means the rotation speed of the engine EG, is required. That is, an excessive increase of the rotational power of the engine EG is required in order to increase the output current.

For example, a situation is assumed in which, when the rotation speed is N1 and the output current is I1, a request for an increased current is issued so that the current needs to be increased to I2. In this situation, if the current supply system 3 is fixed in the first state which corresponds to H1 in the graph, an excessive increase of the rotation speed of the rotor 31 occurs. In other words, an excessive increase of the rotation speed of the engine EG occurs. This decreases the fuel efficiency of the engine EG itself.

The induced voltage of the winding 321 is substantially in proportion to the rotation speed of the rotor 31. A significant increase of the rotation speed causes a significant increase of the induced voltage. To withstand the significant increase of the voltage, electrical components need to have a high breakdown voltage, which leads to a decrease in efficiency and a size increase of the system due to an increased breakdown voltage of the electrical components.

From the viewpoint of achieving an improved fuel efficiency and downsizing, narrowing the range of the rotation speed of the engine EG is subject to consideration. Narrowing the range of the rotation speed of the engine EG leads to narrowing the range of the output current.

In the current supply system 3 of this embodiment, the supply current adjustment device 33 changes the magnetic resistance of the magnetic circuit F32 for the winding 321, which passes through the stator core 322, in accordance with the current request. Thus, the supply current adjustment device 33 changes the inductance of the winding 321. Thus, the supply current adjustment device 33 adjusts the current to be supplied to the motor 18. To be specific, the supply current adjustment device 33 moves the second stator core part 324 so as to shift from the first state (see FIG. 6A) to the second state (see FIG. 6B). In this manner, the supply current adjustment device 33 is able to change the output current characteristics from the characteristics represented by the broken line H1 to the characteristics represented by the solid line H2 of FIG. 7.

As for the output current characteristics, for example, increasing the thickness of the winding or the amount of magnets in a typical generator makes it possible to ensure the output current represented by the broken line H1 of FIG. 7 in a region where the rotation speed is low. Also, increasing the thickness of the winding or the amount of magnets in a typical generator makes it possible to obtain such characteristics that the output current increases in accordance with an increase of the rotation speed as represented by the solid line H2 in a region where the rotation speed is high. Increasing the thickness of the winding or the amount of magnets, however, leads to a size increase of the current supply system itself.

As a method for adjusting the current to be supplied to the motor 18, for example, use of a DC-DC converter is conceivable. A DC-DC converter configured to input and output electric power capable of driving the vehicle V, however, cannot avoid a size increase of its component such as a built-in transformer in response to an increase of required electric power.

In the current supply system 3 of this embodiment, the supply current adjustment device 33 changes the magnetic resistance of the magnetic circuit F32 for the winding 321, which passes through the stator core 322, in accordance with the current request. Thus, the supply current adjustment device 33 changes the inductance of the winding 321. This enables the current to be adjusted in accordance with the current request without increasing the thickness of the winding or the amount of magnets.

That is, the current supply system 3 of this embodiment is capable of downsizing. In addition, the current supply system 3 of this embodiment is compatible with both the engine EG with a wide rotation speed range and the engine EG with a narrow rotation speed range, and able to supply the current appropriately.

Referring to FIG. 5 again, the supply voltage adjustment device 34 of the current supply system 3 will be described.

The current supply system 3 includes the supply voltage adjustment device 34 in addition to the supply current adjustment device 33.

The supply voltage adjustment device 34 changes a linkage flux that is outputted from the magnetic pole part 311 of the rotor 31 and linked with the winding 321. Thus, the supply voltage adjustment device 34 changes the induced voltage of the winding 321, to adjust the voltage to be supplied to the motor 18. To be specific, the supply voltage adjustment device 34 moves the rotor 31 in the axial direction X. Thus, the supply voltage adjustment device 34 changes an air gap length L31 between the rotor 31 and the stator 32. Such a movement of the rotor 31 in the axial direction X is implemented by, for example, a voltage supply adjustment mechanism 344 configured to move a bearing part 313 in the axial direction X, the bearing part 313 supporting the rotor 31 in a rotatable manner. The voltage supply adjustment mechanism 344 is controlled by a voltage supply control device 342. The change of the air gap length L31 between the rotor 31 and the stator 32 leads to a change of the magnetic resistance between the rotor 31 and the stator 32. As a result, the amount of the magnetic flux generated by the magnetic pole part 311 and linked with the winding 321 is changed. The voltage supplied by the current supply system 3 is changed accordingly.

The current supply system 3 of this embodiment includes the supply voltage adjustment device 34 in addition to the supply current adjustment device 33. Thus, the separation between the adjustment of the current to be supplied to the motor 18 and the adjustment of the voltage to be supplied to the motor 18 can be further enhanced, so that an adjustment that is more responsive to each of the current request and the voltage request can be made. For example, the voltage to be supplied to the motor 18 corresponds mainly to the rotation speed of the motor 18, and the current to be supplied to the motor 18 corresponds mainly to the output torque of the motor 18. The current supply system 3 of this embodiment is able to make adjustments responsive to both of the requests for the rotation speed and the output torque of the motor 18.

The supply voltage adjustment device 34 is capable of more reduction of a variation in the linkage flux linked with the winding 321, the variation caused by an operation of the supply current adjustment device 33, the more reduction achieved in the following manner.

The linkage flux that is outputted from the magnetic pole part 311 of the rotor 31 and linked with the winding 321 flows through the stator core 322. Specifically, the linkage flux that is outputted from the magnetic pole part 311 and linked with the winding 321 flows through the first stator core part 323 and the second stator core part 324.

In response to the supply current adjustment device 33 moving the second stator core part 324 so as to shift from the first state (see FIG. 6A) to the second state (see FIG. 6B), the air gap length L32, L34 between the first stator core part 323 and the second stator core part 324 is changed. As a result, the amount of the linkage flux that is outputted from the magnetic pole part 311 of the rotor 31 and linked with the winding 321 is changed.

The supply voltage adjustment device 34 changes the air gap length L31 between the rotor 31 and the stator 32 so as to compensate for a variation in the linkage flux linked with the winding 321, the variation caused by the operation of the supply current adjustment device 33. This can reduce the variation in the linkage flux linked with the winding 321, the variation caused by the operation of the supply current adjustment device 33.

The supply current adjustment device 33, in combination with the compensation made by the supply voltage adjustment device 34, is able to adjust the current while less influenced by voltage constraints.

The third embodiment described above with reference to the current characteristics graph of FIG. 7 illustrates that the current to be supplied to the electrical load device can be adjusted with less interaction between the voltage change and the current change. Here, it is to be noted that in the first embodiment and the second embodiment as well, the current to be supplied to the electrical load device can be adjusted with less interaction between the voltage change and the current change.

The broken line H1 of FIG. 7 represents exemplary output current characteristics obtained when the magnetic resistance of the magnetic circuit for the winding, which passes through the stator core, is low. The solid line H2 of FIG. 7 represents exemplary output current characteristics obtained when the magnetic resistance of the magnetic circuit for the winding, which passes through the stator core, is high. That is, the output current characteristics of the current supply system (generator) shown in FIG. 7 are not to be interpreted as limiting the change of the magnetic resistance of the magnetic circuit for the winding, which passes through the stator core, to a two-stage change as illustrated in this embodiment. The output current characteristics of the current supply system may be changed in a plurality of stages or in a single stage, or may be changed continuously. The output current characteristics represented by the broken line H1 and the solid line H2 of FIG. 7 are contained in the output current characteristics that are changed in a plurality of stages, in a single stage, or continuously. In the present invention, the magnetic resistance of the magnetic circuit for the winding, which passes through the stator core, may be changed in two stages.

A situation where the supply current adjustment device changes the state of the current supply system from one of a high-resistance state and a low-resistance state to the other will be described. In the low-resistance state, the magnetic resistance of the magnetic circuit for the winding, which passes through the stator core, is lower than that in the high-resistance state. For example, in a case where the state of the current supply system is changed so as to increase the magnetic resistance of the magnetic circuit for the winding, which passes through the stator core; the state of the current supply system before the change is the low-resistance state and the state of the current supply system after the change is the high-resistance state. In a case where the state of the current supply system is changed so as to reduce the magnetic resistance of the magnetic circuit for the winding, which passes through the stator core; the state of the current supply system before the change is the high-resistance state and the state of the current supply system after the change is the low-resistance state. Thus, no particular limitation is put on the absolute value of the magnetic resistance of the magnetic circuit for the winding, which passes through the stator core, in each of the high-resistance state and the low-resistance state. The high-resistance state and the low-resistance state are defined in a relative sense. The inductance of the winding in the high-resistance state is lower than the inductance of the winding in the low-resistance state.

In an example described below, exemplary output current characteristics of the current supply system in the low-resistance state correspond to the broken line H1 of FIG. 7, and exemplary output current characteristics of the current supply system in the high-resistance state correspond to the solid line H2 of FIG. 7. At the rotation speed (M) corresponding to the intersection M between the broken line H1 and the solid line H2, the current supply system in the high-resistance state and the current supply system in the low-resistance state output an equal magnitude of current at the equal rotation speed (M). That is, output current characteristic curves (H1, H2) of the current supply system obtained before and after the change of the magnetic resistance of the magnetic circuit for the winding, which passes through the stator core, have the intersection therebetween, and there is the rotation speed (M) corresponding to this intersection. Here, an output current characteristic curve means a curve representing the output current of the current supply system relative to the rotation speed of the rotor.

As shown in FIG. 7, the current supply system of the present invention is configured such that, in a case where the supply current adjustment device changes the state of the current supply system from the low-resistance state to the high-resistance state, the current supply system in the high-resistance state (H2) is able to output a current (I2) when rotating at a rotation speed (M+) higher than the rotation speed (M), the current (I2) being larger than the maximum current that could be outputted by the current supply system in the low-resistance state (H1) rotating at the rotation speed (M+). In the current supply system of the present invention, the state of the current supply system is changed so as to increase the magnetic resistance of the magnetic circuit for the winding, which passes through the stator core, thus enabling the current supply system to output a large current that could not be outputted at a relatively high rotation speed before the change.

As shown in FIG. 7, the current supply system of the present invention is configured such that, in a case where the supply current adjustment device changes the state of the current supply system from the high-resistance state to the low-resistance state, the current supply system in the low-resistance state (H1) is able to output a current when rotating at a rotation speed (M−) lower than the rotation speed (M), the current being larger than the maximum current that could be outputted by the current supply system in the high-resistance state (H2) rotating at the rotation speed (M−). In the current supply system of the present invention, the state of the current supply system is changed so as to reduce the magnetic resistance of the magnetic circuit for the winding, which passes through the stator core, thus enabling the current supply system to output a large current that could not be outputted at a relatively low rotation speed before the change.

As thus far described, the current supply system of the present invention is configured such that the current supply system after the supply current adjustment device changes the magnetic resistance of the magnetic circuit for the winding, which passes through the stator core, is able to output a current at the rotation speed (M− or M+) higher or lower than the rotation speed (M), the current being larger than the maximum current that the current supply system could output at the rotation speed (M− or M+) before the change.

In the third embodiment described above, the current supply system 3 includes both the supply current adjustment device 33 and the supply voltage adjustment device 34. The supply voltage adjustment device, however, is not indispensable in the current supply system of the present invention.

The first stator core part 323, which is illustrated as an example of the first stator core part in the third embodiment above, has, in its end portion opposed to the rotor, protruding portions protruding in the circumferential direction Z which means the direction in which the first stator core parts are arranged side by side. It is however not always necessary that first stator core part of the present invention includes the protruding portions.

In the embodiments described above, the rotor and the stator having an axial gap structure are illustrated as an example. The current supply system of the present invention is also applicable to a radial gap structure in which a rotor and a stator are opposed to each other with an air gap therebetween with respect to a radial direction. The axial direction X (FIGS. 2A and 2B) defined in the axial gap structure of these embodiments is one example of the direction in which the rotor and the stator of the present invention are opposed to each other. In the radial gap structure, the rotor and the stator are opposed to each other with respect to the radial direction.

In the embodiments described above, the current supply system including an SPM generator is illustrated as an example. Alternatively, the current supply system of the present invention may be an IPM (Interior Permanent Magnet) generator.

The air gap illustrated in the embodiments described above is one example of the non-magnetic gap. The non-magnetic gap is a gap made of a single type of a non-magnetic material or a plurality of types of non-magnetic materials. No particular limitation is put on the non-magnetic material. Examples of the non-magnetic material include air, aluminum, and resins. It is preferable that the non-magnetic gap includes at least an air gap.

In the embodiments described above, the configuration in which the rotor 11 is connected directly to the output shaft C of the engine EG is illustrated as a specific example of the configuration in which the rotor 11 is connected to the engine EG. Here, the output shaft C of the engine EG and the rotor 11 of the current supply system 1 may be connected with interposition of a transmission mechanism as typified by a belt, a gear, or a drive shaft. It is however preferable that the output shaft C of the engine EG and the rotor 11 of the current supply system 1 are connected without interposition of a transmission having a variable gear ratio. In other words, it is preferable that the ratio of the rotation speed of the rotor 11 of the current supply system 1 to the rotation speed of the output shaft C of the engine EG is fixed. The ratio (speed ratio) may be greater than one, equal to one, or less than one. When the output shaft C and the rotor 11 are connected with interposition of a speed-increasing mechanism, the ratio exceeds one. When the output shaft C and the rotor 11 are connected with interposition of a constant-speed mechanism, the ratio is one. When the output shaft C and the rotor 11 are connected with interposition of a speed-reducing mechanism, the ratio is less than one.

In the embodiments described above, the accelerator operator is illustrated as an example of the request indication device A. Here, the current request issued to the current supply system of the present invention may not always need to be an output of the accelerator operator. The following is some examples of the request indication device and the current request issued by the request indication device:

a signal of requesting acceleration issued by an automatic speed control device (cruise control) of the vehicle;

an output of a switch and volume different from the accelerator operator, which is operated by the driver; or an output of an operator provided in the electrical load device.

The embodiments described above illustrate the example in which the supply current adjustment device 13 reduces the inductance of the winding 121 by reducing the magnetic resistance of the magnetic circuit F2 for the winding 121 in accordance with the request for increasing the current. It is however not always necessary that the reduction of the magnetic resistance of the magnetic circuit for the winding implemented by the supply current adjustment device of the present invention is in accordance with the request for increasing the current.

The embodiments described above illustrate the example in which the current adjustment control device constituted of a microcontroller or a wired logic (logic circuit) is provided. The current request issued to the current supply system is not limited to an electrical signal. It may be also acceptable that the supply current adjustment device of the present invention is operated by, for example, a wire connected to an operation lever. Such a configuration may eliminate the microcontroller and the motor, and the supply current adjustment device moves the stator core by using a force transmitted from the wire.

The current request may be issued to the current supply system by human operation. For example, it is conceivable that the supply current adjustment device of the present invention includes a lever that is moved in conjunction with the stator core so that the stator core is moved by a person operating the lever.

In the embodiments described above, the motor 18 is illustrated as an example of the electrical load device. The electrical load device of the present invention, however, is not limited thereto, and it may be an electrical heating device that converts electric power into heat, for example.

In the embodiments described above, the vehicle is illustrated as an example of the apparatus to which the current supply system is applied. The current supply system of the present invention, which is capable of downsizing, is suitably adoptable as a current supply system mounted on a vehicle. This, however, does not limit applications of the current supply system of the present invention, and it may be applicable to a power generation apparatus, for example.

In the embodiments described above, the engine EG is illustrated as an example of the drive source. The drive source of the present invention, however, is not limited thereto, and it may be a turbine or windmill, for example.

It should be understood that the terms and expressions used in the embodiments above are for descriptions and have no intention to be construed in a limited manner, do not eliminate any equivalents of features shown and mentioned herein, and allow various modifications falling within the claimed scope of the present invention. The present invention may be embodied in many different forms. The present disclosure is to be considered as providing examples of the principles of the invention. A number of illustrative embodiments are described herein with the understanding that such examples are not intended to limit the invention to preferred embodiments described herein and/or illustrated herein. The embodiments described herein are not limiting. The present invention includes any and all embodiments having equivalent elements, modifications, omissions, combinations, adaptations and/or alterations as would be appreciated by those in the art based on the present disclosure. The limitations in the claims are to be interpreted broadly based on the language employed in the claims and not limited to examples described in the present specification or during the prosecution of the application. The present invention should be interpreted broadly based on the language employed in the claims.

REFERENCE SIGNS LIST 1, 2, 3 current supply system
11, 21, 31 rotor 12, 22, 32 stator
13, 23, 33 supply current adjustment device
111, 311, 211 magnetic pole part
121, 221, 321 winding

The invention claimed is:

1. A current supply system configured to receive a rotational driving force and supply a current for driving an electrical load device in accordance with a current requirement, the current supply system comprising:
a rotor, including a permanent magnet, configured to receive the rotational driving force;
a stator including
a stator core, and
a winding wound around the stator core, at least one portion of the stator core and the winding being movable relative to each other,
a magnetic circuit for the winding passing through the stator core, the rotational driving force causing the rotor and the stator to generate the current; and
a supply current adjustment device configured to change magnetic resistance of the magnetic circuit for the winding in accordance with the current requirement, to thereby switch between a low-resistance state and a high-resistance state, and to thereby change an inductance of the winding to adjust the generated current, wherein
for each rotation speed of the rotational driving force, the current generated by the stator is of a first amount and a second amount when the supply current adjustment device is in the low-resistance state and the high-resistance state, respectively, the first amount being larger than the second amount when said each rotation speed is lower than a threshold, and smaller than the second amount when said each rotation speed is higher than the threshold, and
the supply current adjustment device is configured to, responsive to receipt of the current requirement,
switch from the low-resistance state to the high-resistance state when a rotation speed of the received rotational driving force is higher than the threshold, and
switch from the high-resistance state to the low-resistance state when the rotation speed of the received rotational driving force is lower than the threshold.

2. The current supply system according to claim 1, wherein
the magnetic circuit for the winding passes through the stator core, and includes at least a non-magnetic gap between the winding and the rotor, and
the supply current adjustment device adjusts the current to be supplied to the electrical load device, by changing magnetic resistance of the non-magnetic gap between the winding and the rotor, to thereby change the inductance of the winding.

3. The current supply system according to claim 1, wherein
the magnetic circuit for the winding passes through the stator core, and includes at least one non-magnetic gap, and
the supply current adjustment unit adjusts the current to be supplied to the electrical load device, by changing the inductance of the winding, the inductance of the winding being changed by changing magnetic resistance of, among the at least one non-magnetic gap, a non-magnetic gap whose magnetic resistance is highest when the inductance of the winding is set to a highest settable value.

4. The current supply system according to claim 3, wherein
the rotor generates a magnetic flux linked with the winding, and
the supply current adjustment device adjusts the supply current by changing the inductance of the winding at a change rate that is higher than a change rate of the magnetic flux linked with the winding.

5. The current supply system according to claim 4, wherein the supply current adjustment device adjusts the current to be supplied to the electrical load device, by changing the magnetic resistance of the magnetic circuit for the winding, the winding passing through the stator core, the change of the magnetic resistance being implemented by moving at least a portion of the stator core relative to the winding in accordance with the current requirement.

6. The current supply system according to claim 3, wherein the supply current adjustment device adjusts the current to be supplied to the electrical load device, by changing the magnetic resistance of the magnetic circuit for the winding, the winding passing through the stator core, the change of the magnetic resistance being implemented by moving at least a portion of the stator core relative to the winding in accordance with the current requirement.

7. The current supply system according to claim 2, wherein
the rotor generates a magnetic flux linked with the winding, and
the supply current adjustment device adjusts the supply current by changing the inductance of the winding at a change rate that is higher than a change rate of the magnetic flux linked with the winding.

8. The current supply system according to claim 7, wherein the supply current adjustment device adjusts the current to be supplied to the electrical load device, by changing the magnetic resistance of the magnetic circuit for the winding, the winding passing through the stator core, the change of the magnetic resistance being implemented by moving at least a portion of the stator core relative to the winding in accordance with the current requirement.

9. The current supply system according to claim 2, wherein the supply current adjustment device adjusts the current to be supplied to the electrical load device, by changing the magnetic resistance of the magnetic circuit for the winding, the winding passing through the stator core, the change of the magnetic resistance being implemented by moving at least a portion of the stator core relative to the winding in accordance with the current requirement.

10. The current supply system according to claim 1, wherein
the magnetic circuit for the winding passes through the stator core, and includes at least one non-magnetic gap, and
the supply current adjustment unit adjusts the current to be supplied to the electrical load device, the adjustment being implemented by changing the inductance of the winding, the inductance of the winding being changed by changing magnetic resistance of, among the at least one non-magnetic gap, a non-magnetic gap whose magnetic resistance is highest when the inductance of the winding is set to a highest settable value.

11. The current supply system according to claim 10, wherein
the rotor generates a magnetic flux linked with the winding, and
the supply current adjustment device adjusts the supply current by changing the inductance of the winding at a change rate that is higher than a change rate of the magnetic flux linked with the winding.

12. The current supply system according to claim 11, wherein the supply current adjustment device adjusts the current to be supplied to the electrical load device, by changing the magnetic resistance of the magnetic circuit for the winding, the winding passing through the stator core, the change of the magnetic resistance being implemented by moving at least a portion of the stator core relative to the winding in accordance with the current requirement.

13. The current supply system according to claim 10, wherein the supply current adjustment device adjusts the current to be supplied to the electrical load device, by changing the magnetic resistance of the magnetic circuit for the winding, the winding passing through the stator core, the change of the magnetic resistance being implemented by moving at least a portion of the stator core relative to the winding in accordance with the current requirement.

14. The current supply system according to claim 1, wherein
the rotor generates a magnetic flux linked with the winding, and
the supply current adjustment device adjusts the supply current by changing the inductance of the winding at a change rate that is higher than a change rate of the magnetic flux linked with the winding.

15. The current supply system according to claim 14, wherein the supply current adjustment device adjusts the current to be supplied to the electrical load device, by changing the magnetic resistance of the magnetic circuit for the winding, the winding passing through the stator core, the change of the magnetic resistance being implemented by moving at least a portion of the stator core relative to the winding in accordance with the current requirement.

16. The current supply system according to claim 1, wherein the supply current adjustment device adjusts the current to be supplied to the electrical load device, by changing the magnetic resistance of the magnetic circuit for the winding, the winding passing through the stator core, the change of the magnetic resistance being implemented by moving at least a portion of the stator core relative to the winding in accordance with the current requirement.

17. The current supply system according to claim 16, wherein the supply current adjustment device adjusts the current to be supplied to the electrical load device by causing the at least one portion of the stator core to move relative to the winding while maintaining a position of the stator core relative to the rotor.

18. The current supply system according to claim 1, wherein the supply current adjustment device adjusts the current to be supplied to the electrical load device, by changing the magnetic resistance of the magnetic circuit for the winding, the winding passing through the stator core, the change of the magnetic resistance being implemented by moving the winding in accordance with the current requirement.

19. The current supply system according to claim 1, further comprising a supply voltage adjustment device configured to change a linkage flux flowing from the permanent magnet of the rotor and linked with the winding, to thereby change an induced voltage of the winding to adjust a voltage to be supplied to the electrical load device.

20. The current supply system according to claim 19, wherein the supply voltage adjustment device changes the linkage flux by moving the permanent magnet relative to the winding.

21. The current supply system according to 19, wherein the supply voltage adjustment device includes a voltage supply adjustment mechanism configured to change the linkage flux flowing from the permanent magnet of the rotor and linked with the winding by moving the rotor, to thereby change the induced voltage of the winding to adjust the supply voltage.

22. The current supply system according to claim 21, wherein the supply voltage adjustment device further includes a voltage adjustment control device that is one of
a circuit, and
a processor executing program instructions,
configured to control the voltage supply adjustment mechanism to move the rotor in accordance with the current requirement.

23. The current supply system according to claim 1, wherein
the stator core includes a plurality of first stator core parts, each having a facing portion that opposes the rotor with a non-magnetic gap therebetween, and a second stator core part, and
the supply current adjustment device changes the magnetic resistance of the magnetic circuit for the winding, the winding passing through the stator core, by moving one, relative to the others, of the plurality of first stator core parts and the second stator core part in accordance with the current requirement.

24. The current supply system according to claim 23, wherein the move of the one of the plurality of first stator core parts and the second stator core part relative to the others causes a state of the stator to shift from
a first state in which a length of a non-magnetic gap between each of the plurality of first stator core parts and the second stator core part is shorter than a length of a non-magnetic gap between adjacent ones of the plurality of first stator core parts
to
a second state in which the length of the non-magnetic gap between each of the plurality of first stator core parts and the second stator core part is longer than the length of the non-magnetic gap between adjacent ones of the plurality of first stator core parts.

25. An electric power supply system, comprising:
the current supply system according to claim 1; and
a drive source configured to provide the rotational driving force, a rotation speed of the drive source being changeable to change a rotation speed of the rotor, to thereby adjust a voltage to be supplied to the electrical load device.

26. The current supply system according to claim 1, wherein the supply current adjustment device includes a current adjustment mechanism configured to change the magnetic resistance of the magnetic circuit for the winding by moving one of the winding and at least one portion of the stator core, to thereby change the inductance of the winding to adjust the generated current.

27. The current supply system according to claim 26, wherein the supply current adjustment device further includes a current adjustment control device that is one of
a circuit, and
a processor executing program instructions,
configured to control the current adjustment mechanism to move the winding or the at least a portion of the stator core in accordance with the current requirement.

28. A control device for use in a current supply system that includes a rotor, including a permanent magnet, configured to receive a rotational driving force, and a stator including a stator core, and a winding wound around the stator core, a magnetic circuit for the winding passing through the stator core, at least one portion of the stator core and the winding being movable relative to each other, the rotational driving force causing the rotor and the stator to generate a current for driving an electrical load device in accordance with a current requirement, the control device comprising:

one of a circuit and a processor executing program instructions, configured to change magnetic resistance of the magnetic circuit for the winding in accordance with the current requirement, to thereby switch between a low-resistance state and a high-resistance state, and to thereby change an inductance of the winding to adjust the generated current, wherein for each rotation speed of the rotational driving force, the generated current is of a first amount in the low-resistance state and a second amount in the high-resistance state, the first amount being larger than the second amount when said each rotation speed is lower than a threshold, and smaller than the second amount when said each rotation speed is higher than the threshold, and said one of the circuit and the processor is further configured to, responsive to receipt of the current requirement, switch the low-resistance state to the high-resistance state when a rotation speed of the received rotational driving force is higher than the threshold, and switch the high-resistance state to the low-resistance state when the rotation speed of the received rotational driving force is lower than the threshold.

* * * * *